(12) United States Patent
Devitt

(10) Patent No.: US 9,441,668 B2
(45) Date of Patent: Sep. 13, 2016

(54) AIR BEARING FOR USE AS SEAL

(71) Applicant: NEW WAY MACHINE COMPONENTS, INC., Aston, PA (US)

(72) Inventor: Andrew Devitt, Media, PA (US)

(73) Assignee: NEW WAY MACHINE COMPONENTS, INC., Aston, PA (US)

( * ) Notice: Subject to any disclaimer, the term of this patent is extended or adjusted under 35 U.S.C. 154(b) by 0 days.

(21) Appl. No.: 14/305,763

(22) Filed: Jun. 16, 2014

(65) Prior Publication Data

US 2014/0294329 A1    Oct. 2, 2014

Related U.S. Application Data

(63) Continuation of application No. 13/733,806, filed on Jan. 3, 2013, now Pat. No. 8,753,014.

(60) Provisional application No. 61/582,674, filed on Jan. 3, 2012, provisional application No. 61/704,927, filed on Sep. 24, 2012, provisional application No. 61/728,595, filed on Nov. 20, 2012.

(51) Int. Cl.
*F16C 33/74*    (2006.01)
*F16C 32/06*    (2006.01)
(Continued)

(52) U.S. Cl.
CPC ....... *F16C 32/0685* (2013.01); *F16C 32/0603* (2013.01); *F16C 32/067* (2013.01); *F16C 32/0618* (2013.01); *F16C 32/0677* (2013.01); *F16C 32/0692* (2013.01); *F16C 33/748* (2013.01); *F16J 15/342* (2013.01); *F16C 11/0666* (2013.01); *F16C 2202/10* (2013.01)

(58) Field of Classification Search
CPC .... F16C 11/0666; F16C 17/04; F16C 17/10; F16C 32/0618; F16C 32/0685; F16C 32/0603; F16C 32/0614; F16C 32/0622; F16C 32/0629; F16C 32/064; F16C 33/748; F16C 2202/10; F16J 15/342
See application file for complete search history.

(56) References Cited

U.S. PATENT DOCUMENTS

| | | | |
|---|---|---|---|
| 1,814,833 A | 7/1931 | Doran | |
| 2,086,896 A | 7/1937 | Carter | |
| 2,125,446 A * | 8/1938 | Hurtt | 384/134 |

(Continued)

FOREIGN PATENT DOCUMENTS

| | | | |
|---|---|---|---|
| DE | 102 01 956 | | 1/2002 |
| DE | 10201956 | * | 1/2002 |

(Continued)

OTHER PUBLICATIONS

Rasnick et al., "Porous Graphite Air-Bearing Components as Applied to Machine Tools," Society of Manufacturing Engineers Technical Report, pp. 1-45 (1974).

(Continued)

*Primary Examiner* — James Pilkington
(74) *Attorney, Agent, or Firm* — Volpe and Koenig, P.C.

(57) ABSTRACT

In order to effect a seal; a porous material which comprises one side of two opposing surfaces is used to restrict and evenly distribute externally pressurized gas, liquid, steam, etc. between the two surfaces, exerting a force which is opposite the forces from pressure differences or springs trying to close the two faces together and so may create a non contact seal that is more stable and reliable than hydrodynamic seals currently in use.

11 Claims, 27 Drawing Sheets

(51) Int. Cl.
*F16J 15/34* (2006.01)
*F16C 11/06* (2006.01)

(56) References Cited

U.S. PATENT DOCUMENTS

| | | | |
|---|---|---|---|
| 2,407,807 A | 9/1946 | Bentley | |
| 2,683,635 A | 7/1954 | Wilcox | |
| 2,683,636 A | 7/1954 | Wilcox | |
| 3,021,146 A * | 2/1962 | Sommer et al. | 277/368 |
| 3,132,903 A * | 5/1964 | Webb | 384/111 |
| 3,169,807 A | 2/1965 | Abel et al. | |
| 3,302,865 A | 2/1967 | Kun | |
| 3,360,309 A | 12/1967 | Voorhies | |
| 3,368,850 A | 2/1968 | Wilcox | |
| 3,395,949 A | 8/1968 | Kun | |
| 3,399,001 A | 8/1968 | Whitaker | |
| 3,450,448 A * | 6/1969 | Weichsel | 384/107 |
| 3,476,451 A | 11/1969 | Schwartzman | |
| 3,502,920 A | 3/1970 | Chaboseau | |
| 3,603,654 A * | 9/1971 | Bird | F16C 17/20 384/102 |
| 3,612,630 A | 10/1971 | Rosensweig | |
| 3,620,581 A | 11/1971 | Heller et al. | |
| 3,650,582 A | 3/1972 | Casey | |
| 3,698,724 A | 10/1972 | Blachere et al. | |
| 3,698,725 A * | 10/1972 | Klabunde | 384/121 |
| 3,701,535 A | 10/1972 | Dieter Born et al. | |
| 3,718,334 A | 2/1973 | Kiwalle | |
| 3,721,479 A | 3/1973 | Rasnick et al. | |
| 3,728,857 A | 4/1973 | Nichols | |
| 3,763,534 A | 10/1973 | Conroy et al. | |
| 4,021,050 A | 5/1977 | Powers | |
| 4,053,162 A | 10/1977 | Bjerk | |
| 4,118,042 A | 10/1978 | Booth | |
| 4,174,842 A | 11/1979 | Partus | |
| 4,199,152 A | 4/1980 | Catterfeld | |
| 4,355,850 A * | 10/1982 | Okano | 384/121 |
| 4,361,332 A | 11/1982 | Logan et al. | |
| 4,613,141 A | 9/1986 | Heinen | |
| 4,664,973 A | 5/1987 | Otfinoski et al. | |
| 4,676,668 A | 6/1987 | Ide | |
| 4,710,034 A | 12/1987 | Tittizer et al. | |
| 4,732,531 A | 3/1988 | Minoda et al. | |
| 4,749,283 A | 6/1988 | Yokomatsu et al. | |
| 4,838,710 A | 6/1989 | Ohta et al. | |
| 4,927,274 A | 5/1990 | Smith | |
| 5,058,905 A | 10/1991 | Nosowicz et al. | |
| 5,280,208 A | 1/1994 | Komura et al. | |
| 5,284,347 A | 2/1994 | Pope | |
| 5,360,273 A | 11/1994 | Buckmann | |
| 5,509,737 A * | 4/1996 | Waskiewicz et al. | 384/138 |
| 5,645,354 A | 7/1997 | Heinzl et al. | |
| 5,713,576 A | 2/1998 | Wasser et al. | |
| 5,722,671 A | 3/1998 | Nosowicz et al. | |
| 5,743,654 A | 4/1998 | Ide et al. | |
| 5,865,441 A | 2/1999 | Orlowski | |
| 6,004,037 A | 12/1999 | Harris et al. | |
| 6,019,515 A | 2/2000 | Fujii et al. | |
| 6,024,491 A | 2/2000 | Bak | |
| 6,062,568 A | 5/2000 | Orlowski et al. | |
| 6,276,145 B1 | 8/2001 | Sharpless et al. | |
| 6,288,465 B1 | 9/2001 | Suzuki et al. | |
| 6,315,452 B1 | 11/2001 | Titcomb | |
| 6,342,270 B1 | 1/2002 | Kumamoto et al. | |
| 6,342,306 B1 | 1/2002 | Ozawa et al. | |
| 6,404,845 B1 | 6/2002 | Sharpless et al. | |
| 6,494,460 B2 | 12/2002 | Uth | |
| 6,505,836 B1 * | 1/2003 | Toshihiko | 277/400 |
| 6,515,288 B1 | 2/2003 | Ryding et al. | |
| 6,659,739 B2 | 12/2003 | Varney et al. | |
| 6,872,002 B2 * | 3/2005 | Tomita et al. | 384/12 |
| 6,881,027 B2 | 4/2005 | Klaass et al. | |
| 7,023,952 B2 | 4/2006 | Brunnett | |
| 7,396,017 B2 | 7/2008 | Orlowski et al. | |
| 7,461,846 B2 | 12/2008 | Chitren | |
| 7,631,878 B1 | 12/2009 | Orlowski et al. | |
| 7,823,885 B2 | 11/2010 | Droscher et al. | |
| 8,073,098 B2 | 12/2011 | Holzermer et al. | |
| 8,123,868 B2 | 2/2012 | Devitt | |
| 8,228,675 B2 | 7/2012 | Koplow | |
| 8,882,446 B2 | 11/2014 | Underbakke | |
| 2001/0053196 A1 | 12/2001 | Sai | |
| 2005/0172800 A1 | 8/2005 | Uchino | |
| 2005/0210875 A1 | 9/2005 | Larue et al. | |
| 2006/0060259 A1 | 3/2006 | Devitt | |
| 2006/0062499 A1 | 3/2006 | Boyd | |
| 2008/0303614 A1 | 12/2008 | Fischer et al. | |
| 2009/0034887 A1 | 2/2009 | Fujikawa et al. | |
| 2010/0143104 A1 | 6/2010 | Furman et al. | |
| 2010/0207389 A1 | 8/2010 | Nyffemegger | |
| 2010/0213674 A1 | 8/2010 | Garrison et al. | |
| 2010/0277020 A1 | 11/2010 | Devitt | |
| 2011/0169225 A1 | 7/2011 | Winkler et al. | |
| 2011/0243762 A1 | 10/2011 | Daikoku et al. | |
| 2012/0163742 A1 | 6/2012 | Underbakke et al. | |

FOREIGN PATENT DOCUMENTS

| | | |
|---|---|---|
| EP | 0 262 939 | 4/1988 |
| EP | 0 488 715 | 6/1992 |
| EP | 0 882 915 | 12/1998 |
| EP | 0 900 959 | 3/1999 |
| EP | 2 386 369 | 11/2011 |
| GB | 2 360 332 | 9/2001 |
| WO | 2010/151138 | 12/2010 |

OTHER PUBLICATIONS

Koplow, "A Fundamentally New Approach to Air-Cooled Heat Exchangers," Sandia Report, SAND2010-0258 (Jan. 2010).

* cited by examiner

AIR BEARING FOR USE AS SEAL

CROSS REFERENCE TO RELATED APPLICATIONS

The present application is a continuation of U.S. patent application Ser. No. 13/733,806 filed Jan. 3, 2013, which will issue as U.S. Pat. No. 8,753,014 on Jun. 17, 2014, and which claims the benefit of U.S. Provisional Application Nos. 61/582,674, filed Jan. 3, 2012; 61/704,927, filed Sep. 24, 2012; and 61/728,595, filed Nov. 20, 2012, whose disclosures are hereby incorporated by reference in their entireties into the present disclosure.

FIELD OF THE INVENTION

The present invention is directed to a seal and more particularly to a seal for use in fields such as the following: oil and gas, power generation (including energy storage like compressed air or pumped hydro storage), aero turbines, chemical processing, paper manufacturing, aeration and water purification, gas separation and other process industries. Within these industries is likely that technology will find its way to; pumps, compressors, turbines, generators, motors, turbo expanders, turbo chargers, mixers, and refiners.

BACKGROUND

Creating and implementing effective seals for rotating equipment has been an effort for almost as long as there has been rotating equipment. And just as there is a broad array in the applications and types of rotating equipment there is also a broad array of seals that are employed in this equipment.

One of the simplest and oldest type of seals, a packing based seal, is still often employed. In this seal a gland can be tightened to compress the packing around the shaft. So there is a balance between how tight to make the packing which causes frictional losses and wears the shaft and how effective the seal is. Lip seals are in another form of contact based seals. They also can wear grooves into the shaft and are subject to wear and leakage themselves. Labyrinth seals are a form of non-contact seal but they provide a conductance path that can result in huge flows when there is significant pressure differentials across the seal. In order to minimize the leakages clearances between the rotating in stationary sections of the seal are minimized to the extent possible. This adds significant costs and still to make them effective they often need to be relatively long axially. There are brush and ablatable type seals which are contact based seals often employing centrifugal force or pressure differentials to keep them in contact with their mating surface. These seals create particulate and are a wear item that becomes a maintenance cost, at high speeds they create significant amounts of heat and frictional losses. Additionally these contact seals create a lot of noise. Bearing isolators are commonly found in process equipment, they typically combine labyrinth and lip type seal technologies and sometimes employ and injection of a fluid or gas at a pressure above that of the volume to be sealed. In example of such an art would be; U.S. Pat. No. 7,631,878 to Orlowski et al.

Mechanical seals and dry gas seals also could be considered injection type seals, as these seals often have some type of a flush or seal gas employed in them. Dry gas seals specifically use hydrodynamic air bearing affects to create very small non-contact gaps that are very effective at sealing. These sealing effects are dependent upon relatively high surface speeds between the sealing surfaces. There is a lot of engineering that goes into the seals in order to keep their bearing surfaces flat and pressed against each other so as to prevent a seizure from contact at speed between the bearing surfaces or a failure to seal because a mechanism that is used to provide axial compliance "Hangs Up" allowing there to be a large gap between the sealing surfaces. Mechanical seals also suffer from the same issues but there sealing surfaces are designed to be relatively good plain bearing partners, still because they are often contact bearings they wear and they create heat. An example of such a seal would be; U.S. Pat. No. 7,823,885 to Droscher which does a good job describing the problems with conventional seals and "hang-ups" and is also an example of a conventional injection type seal. Additionally it is noted that this injection fluid may also help to establish an aerodynamic bearing property at the face of the seal.

The state-of-the-art today includes hydrodynamic bearings such as spiral groove and foil bearings which can become noncontact based on the viscous dragging of a fluid or gas into a gap, there are gas seals and labyrinth seals that attempt to create restriction through small gaps. Examples of gas seals include Pall Corporation and Carbone Turbograph seals. In the case of Carbone they are manufacturers of porous media carbons and graphite's but they do not employ porous media or graphite as a compensation technique for hydrostatic sealing purposes. We suggest this is evidence that using such compensation techniques through porous media is not obvious to them.

In another contemporary example US patent application publication No. 2006/0062499 to Boyd specifically teaching and claiming the use of carbon graphite and ceramic materials and using pressurized gas does not employ porous media compensation. This patent is targeted specifically towards high-speed turbine engines. We suggested this as an example that the use of porous compensation is not obvious.

SUMMARY

Objects of the invention include: to provide more reliable gas seal and mechanical seal surfaces by teaching robust ways of; employing externally pressurized air bearing technology to create high pressures in noncontact sealing gaps; prevent or reduce wear and heat buildup between faces that are meant to run in contact or that may make occasional contact; teach how the combination of bearing and seal technology can dramatically simplify the sealing of rotating equipment and to prevent "hang ups" which is a failure of the compliance or biasing mechanism to keep the faces pressed against each other.

Modern Air bearing technology when applied to Turbo equipment has very interesting applications for replacing conventional bearings and seals (eliminating oil, improving efficiency, reducing noise).

Seals and counter surfaces designed to use one of two opposing sealing surfaces as a porous media to restrict externally supplied hydrostatic pressure into an air bearing gap between the surfaces. This technology would apply to replacing packing in large agitators, mixers or refiners; at the lower end of the seal continuum listed above and mechanical or dry gas seals on the higher end. One embodiment is the blade runner which is particularly well-suited to aero engine sealing enabling a dramatic reduction in friction, wear, and noise with improved stage sealing. Additionally the rotating mass and axial length of the seal is dramatically reduced.

Another embodiment taught is the balance force face seal where mechanical face seals would run in contact with virtually no contact force even though there may be thousands of pounds of closing force.

Externally pressurized gas bearings have several fundamental advantages for use as seals such as:

Noncontact and operate independent of relative motion (they work at zero RPM);

Do so using the process gas in bearing the gap;

Operate at the most extreme temperatures;

Use high pressures but low flows;

Combine sealing and bearing functionality;

As non-contact seals, they have no coulomb friction and no wear. There is viscous shear friction in the air film but this is orders of magnitude less than the bearing friction. This bodes well for reduced energy consumption and allows for strong green sales arguments. Radial and thrust or face type seals are both possible.

Even though they are noncontact they are mechanically coupled to their counter surface via the compression of the air film. As in the example of FIG. 3B, the bushing seal is supported by the spinning shaft it is sealing on. This allows for eliminating alignment issues found in labyrinth seals. This is a self-aligning capability. The seal is stationery with respect to the stator and connected to it through some sort of a flexible bellow, diaphragm or O-ring as examples of compliant mounts. Bearing isolators from manufacturers such as GGB, Waukesha and Crane are examples of the current state of the art in compliant mounts that allow for the shifting of the center of the shaft and also for angular changes of the shaft. The bearing isolators mentioned above use copious quantities of compressed air or injection fluid into a gap as they do not use compensated hydrostatic bearing technology.

The high pressure maintained in the air gap is a highly effective seal against the migration of contamination, liquids and even gases. Conventional labyrinth seals and gas seals that employ pressure flowing into one or more grooves suffer from relatively low pressure (a fraction of a bar) and high flow (volume units per minute). An air bearing seal though, can easily generate 2 bar in the gap and the flow is measured in volume units per hour. An example of such a bearing in a thrust face configuration is our standard line of vacuum preloaded air bearings. It is counterintuitive but we successfully use 2 bar in an annular air gap to separate atmospheric pressure from vacuum which is used to preload the air film in lightly loaded precision stages.

Air bearings have applications to a wide set of categories in sealing technologies but they are not (yet) commonly employed.

Although porous media air bearings are not new and the idea of hydrostatic seals are also not new there is very little in the prior art and even less in practice that combines the advantages of both ideas.

Air bearings as bearings and seals have the potential to revolutionize the fundamental design of Turbo equipment.

Porous hydrostatic seals are not difficult to manufacture. A layer of porous media generally between 0.5 mm to 5 mm thick, shrunk fit and or bonded into a nonporous housing with an air distribution labyrinth between the two layers and a finish boring of the porous media face to the appropriate diameter for the Journal or turning for finish flatness for the thrust face is all that is required. Generally the air gaps are between 2.5 to 25 microns with the shear energy and the flow through the gap both being squared and cubed functions of the gap. The flow through the porous media is determined by the desired flow through the gap and generally being about two times the desired flow with the shaft or thrust face in place. As the speed of the shaft increases, the ideal gap thickness should also increase to minimize heat build-up through shear energy losses. The equations used to determine this are generally known in the art.

Modern Air bearing technology when applied to Turbo equipment has very interesting applications for replacing conventional bearings and seals (eliminating oil, improving efficiency). The specification that follows teaches this in several embodiments.

In order to effect a seal; a porous material which comprises one side of two opposing surfaces is used to restrict and evenly distribute externally pressurized gas, liquid, steam, etc. between the two surfaces, exerting a force which is opposite the forces from pressure differences or springs trying to close the two faces together and so may create a non contact seal that is more stable and reliable than hydrodynamic seals currently in use. The aerostatic pressure may be adjusted to the point where the two faces are completely unloaded and zero contact pressure exists between the two faces even though the faces are in intimate contact. Because the faces are in contact there is approximately zero flow through the gap and the line pressure being fed into the porous material will exist between the two faces. This contact force can easily be adjusted by varying the input pressure to reduce wear and heat generated by friction in conventional contact seals.

BRIEF DESCRIPTION OF THE DRAWINGS

Preferred embodiments of the present invention will be set forth in detail with reference to the drawings, in which:

1A—Simplified single face gas bearing seal

1B—Single face flexible rotating element

1C—Prior art image without description

1D—Tandem face seal in preferred embodiment

Figure 1A:
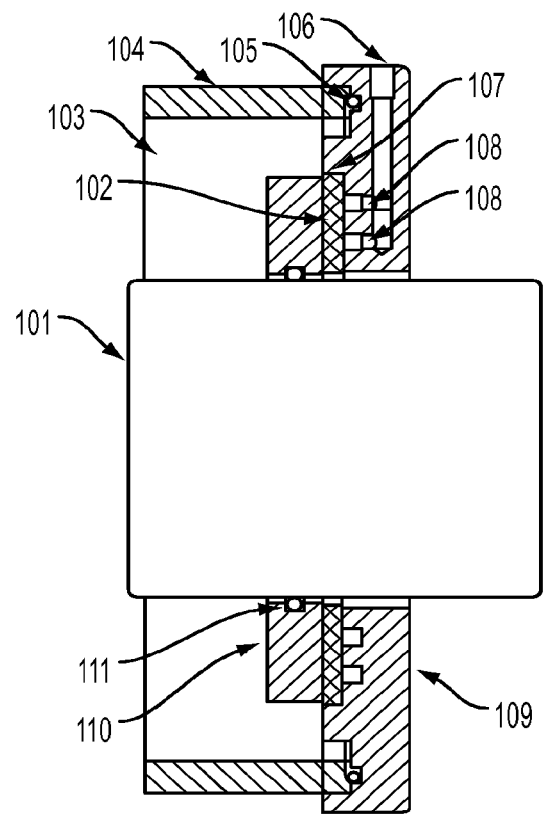

1E—Flexible stationary primary with adjustable air closing force

1F—Flexible stationary primary with mechanical closing force only

1G—Flexible stationary primary with Torus

2A—Double opposed simplified gas bearing seal

2B—Flexible rotating element with double opposed simplified gas bearing seals 2C-1 through 2C-4—porous versus hydrodynamic gas seals 2D—Lift load chart for porous air bearings 3A—Circumferential gas bearing seal 3B—Mounting method for circumferential seal 4A-4B—Single blade seal 5A—Prior art detailed description 5B—Gas bearing eliminates seal 6A—Multi-blade seal 6B—Parallel flexure, aero engines 6C—Close-up of parallel flexure 7A and 7B—Angular seal compliance 7C—Angular and axial seal compliance 8A-8B—Axial, angular, radial unvented seal compliance 9A-9B—Axial angular radial single source 10A-10B—Axial angular radial vented 11A—Balanced force bearing drawing 11B—Balanced force bearing example 12—Method for making bearing seals with wide temperature capability

DETAILED DESCRIPTION OF THE PREFERRED EMBODIMENTS

Preferred embodiments of the present invention are set forth in detail with reference to the drawings, in which like reference numerals refer to like elements throughout. A1

Figure 1B:
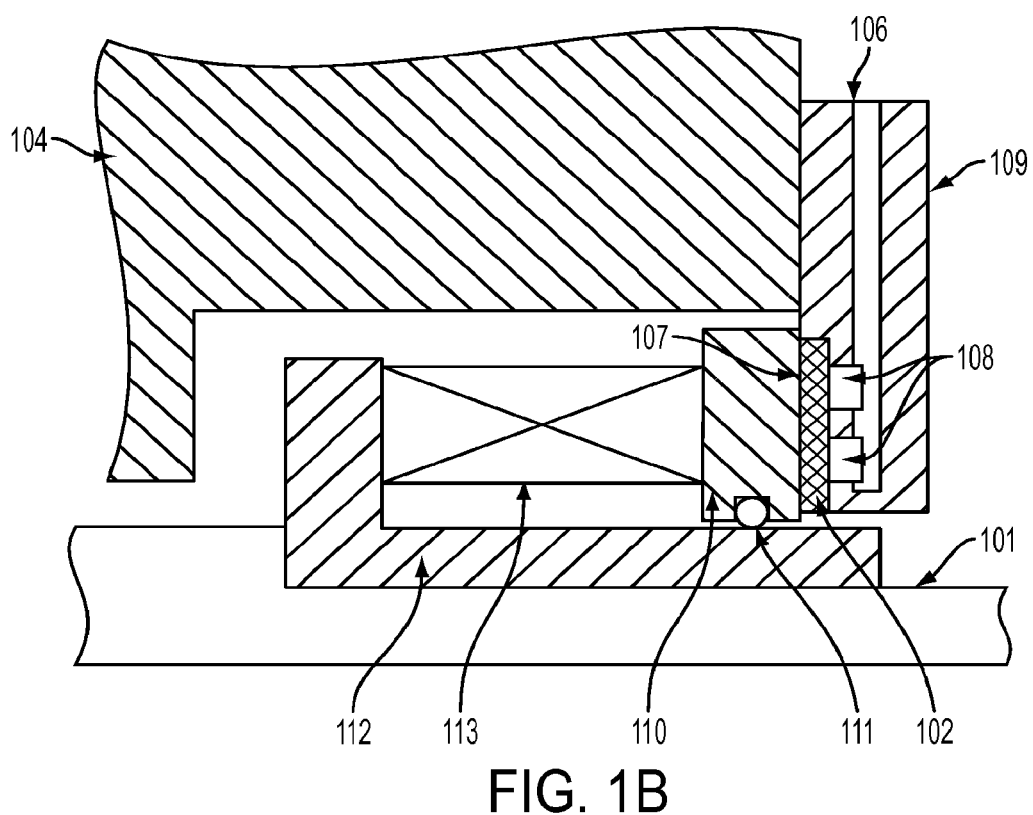
Figure 1C:
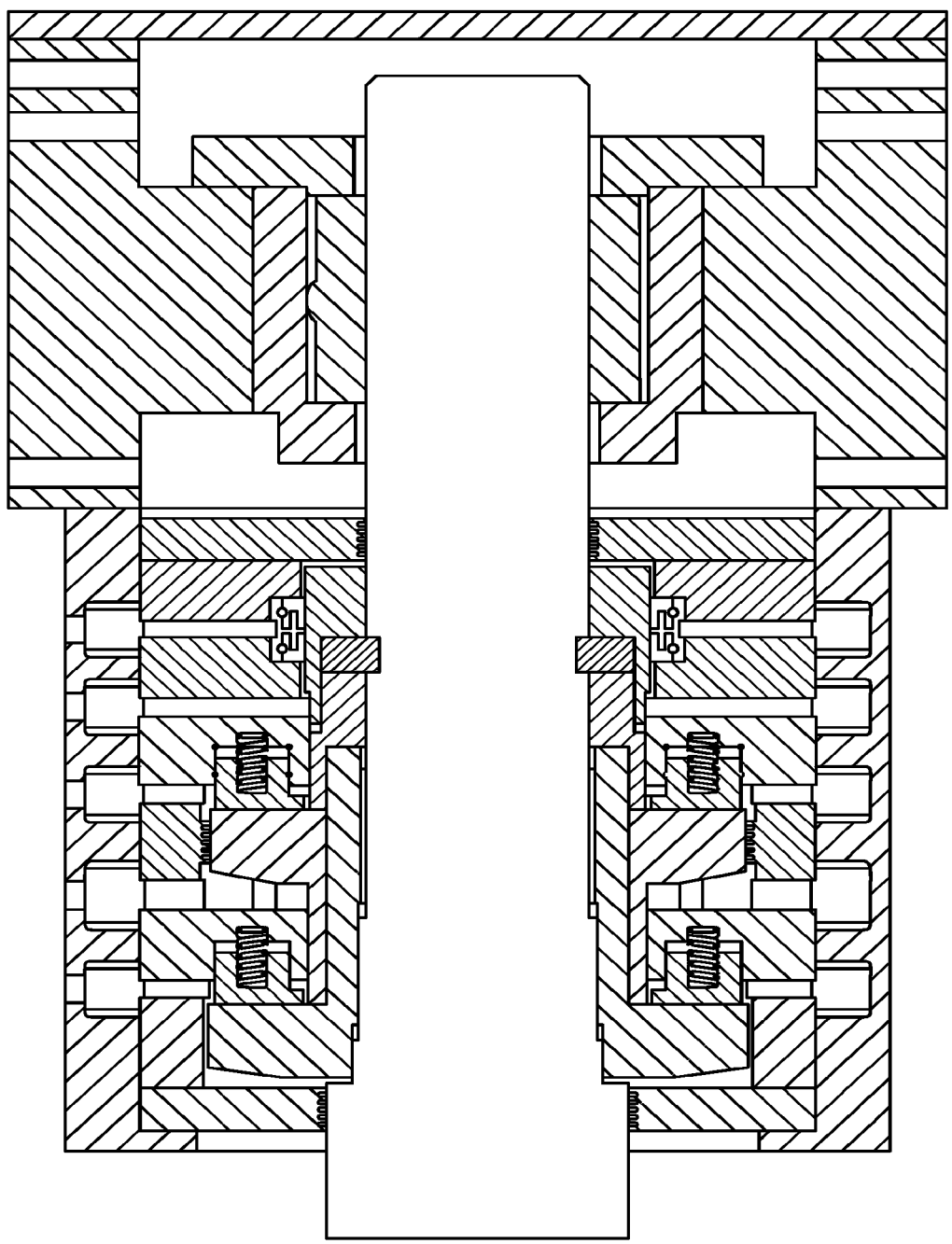

With reference to FIG. 1A; a shaft 101 which may rotate at high speeds has a runner 110 coupled to it via an O-ring 111 (or another mounting mechanism as detailed in illustration 1B or other arrangements detailed in this specification or known in the art). O-rings provide axial compliance to the runner allowing for self adjustment of the gap between it and the stationary surface and axial displacements of the shaft. If the runner is hard mounted to the shaft some axial compliance should be designed into the stationary components. An example of hard mounting the runner to the shaft may include using a mounting ring that is fixed to the shaft by set screws or a shoulder and bolt. The runner is free to move radially on the air film. Conventional mechanical face seals as shown in FIG. 1B often have a spring loading mechanism to urge the opposing faces of the seal into contact. This technique is well-known in the art and may be employed to adjust the load on the seal faces and to provide axial compliance. 103 represents a volume on one side of the seal, this could be a gearbox, a motor-generator housing, or a process fluid or gas such as a mixer, refiner, water pump or gas pipeline compressor, or a seal between compartments in a piece of rotating equipment as examples. 104 would represent the casing or the housing. There may or may not be an adapter plate as shown in 205 of FIG. 2A. The seal body itself 109 would likely mount to the housing casing or adapter plate with an O-ring seal 105. The seal body in illustration 1A refers to a seal that would be lightly loaded, it should be recognized that the seal body and its mounting needs to be stiff enough so that it does not perform significantly under the pressure differentials that are being sealed. The seal body is equipped with conductive passages 106 to communicate the pressurized fluid to the labyrinth 108 (plenum) which evenly distributes the pressurized fluid to the back of the porous media 102. The porous media 102 may be comprised of graphite, carbon, silicon carbide, Tungsten carbide, alumina or basically any porous and or sintered material. These materials are typically found as face seals and mechanical seals and as runners and runner faces in dry gas seals. Just instead of filling or sealing this porosity the porosity is used for air bearing functionality. Porous media air bearing compensation is only one potential solution, orifice, step, grove, inherent or pocketed compensation among other compensation techniques known in the art may be employed. Porous air bearings are known in the art and are described by the inventor in previous applications. Also methods for providing clean fluids at pressure are well-known and readily available. In 1B the difference from FIG. 1A is that the shaft 101 is equipped with a sleeve 112 that is fixed on the shaft and a spring element 113 pushes or biases the runner or mating ring against the porous bearing seal face and or primary ring. As illustrated in FIG. 1A the seal body 109 comprises a plurality of plenums arranged concentrically about the shaft 101 and the porous media covers the plurality of plenums.

The thickness of the gap is a function of the hydrostatic input pressure, the forces urging the faces together (from pressure differences, spring forces, dynamic forces, etc.), the restriction of the porous media and the ratio of surface area to leak edge of the surfaces. These variables may be controlled to create highly effective noncontact seals.

Figure 1D:
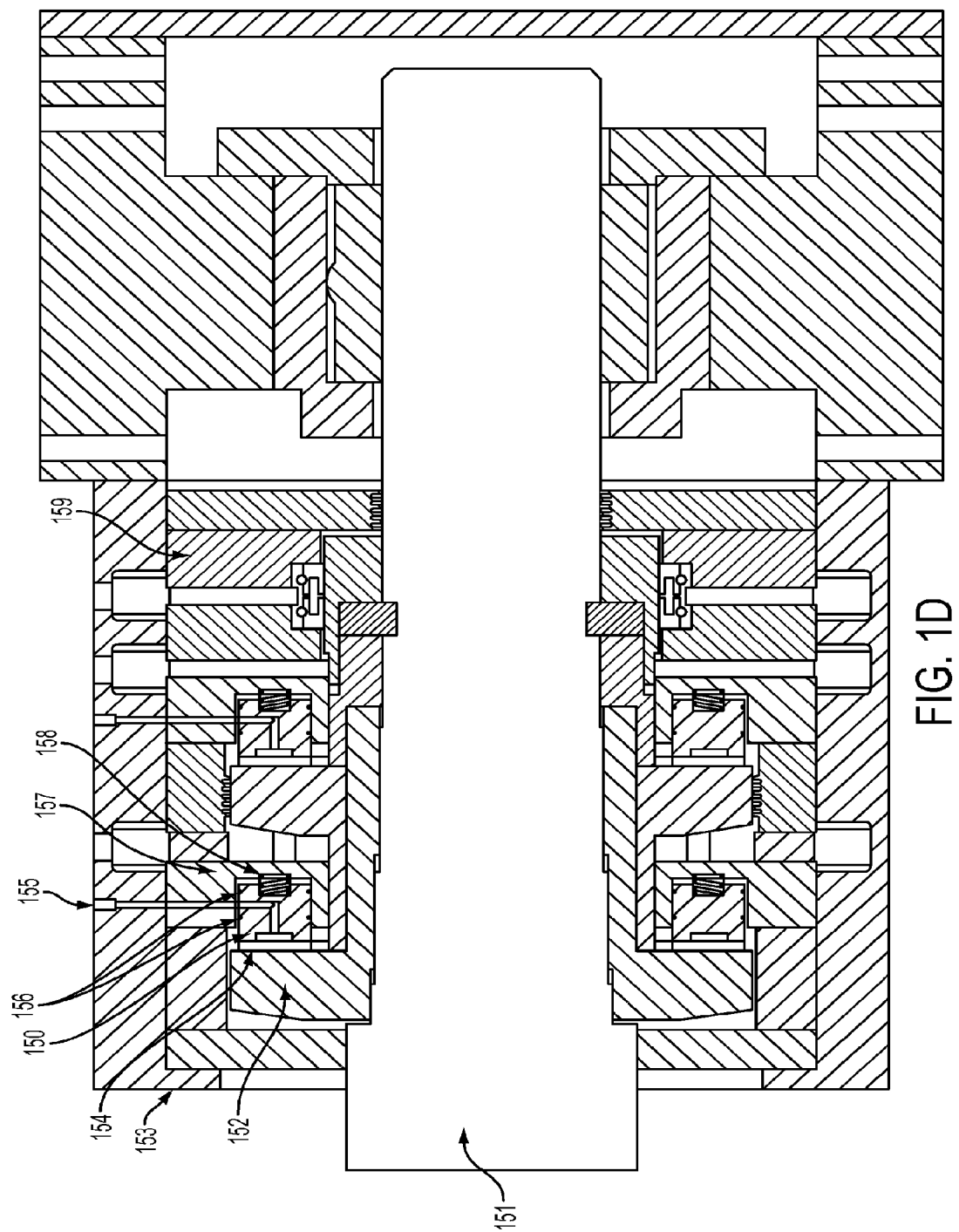

With reference to FIG. 1D; A shaft 151 for a piece of rotating equipment such as a compressor or turbine is fit with a sleeve and meeting ring 152 which cooperates with a primary ring 150. The compressor case 153 receives the seal cartridge 159 as is common in the art and detailed by API standard 682. Pourous face 154 of the primary ring does not rotate is fed pressure through the seal cartridge. When the primary ring is arranged to be a "flexible element", that pressure may be introduced through a port 155 into a Plenum 157 which is sealed with O-rings 156 as also described in FIGS. 1E, 1F, and 1G, or with a method already known in the art including a tube which would screw directly into the primary ring (not shown here but see FIG. 3B). A biasing force which keeps the air bearing primary ring pressed against the rotating mating ring is affected through a spring 158 or a diaphragm type flexure, which is known in the art, and or methods using air pressure, of which two are taught below. In a tandem seal the same description is repeated with regard to the secondary seal.

Figure 1E:
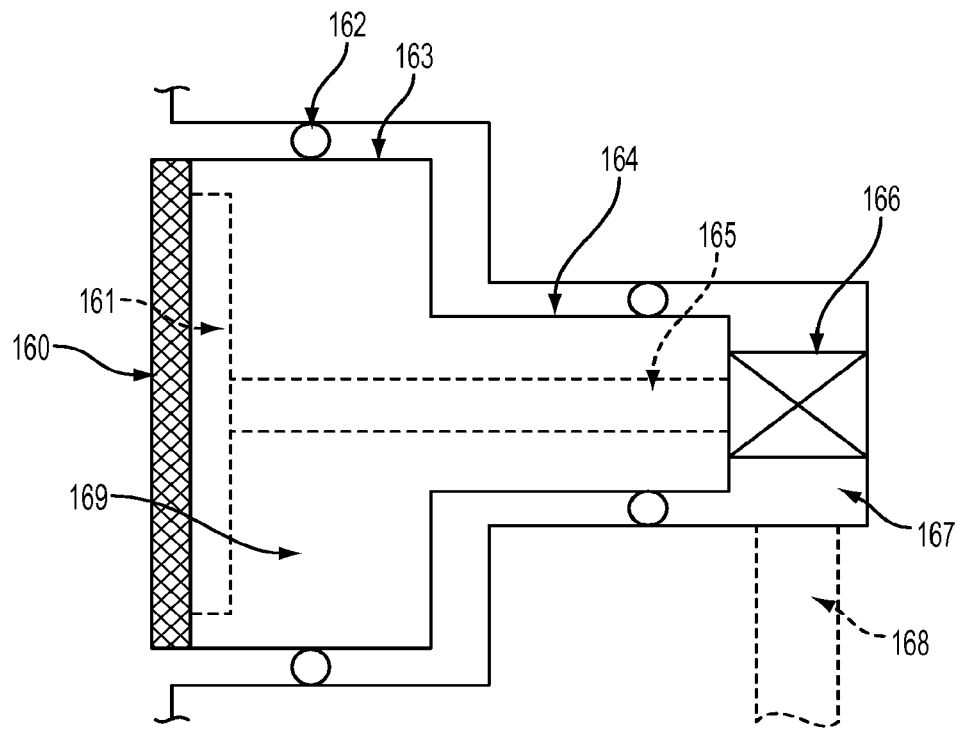

In FIG. 1E a primary ring 169 with a porous face 160 and a Plenum 161 to distribute air pressure behind the porous face 160 is contained inside the seal cartridge by O-rings 162. Port 165 distributes the air from another Plenum 167 which the pressure is introduced to through port 168. 166 is a spring or diaphragm which provides a biasing force pushing the primary ring against the mating ring and provides a compliant mount which provides an axial compliance allowing axial motion of the porous face. It is desirable the primary ring always be pushed up against the mating ring to avoid any potential leakages. A seal "hang up" is when the compliant ring is not forced up against its mating ring for some reason. This allows for undesirable back flows. In order to help prevent "hang ups" the air pressure being fed to the face of the bearing may also be employed on the back of the, in this case, primary ring. The differences in the diameters between 163 and 164 may be designed such as to maintain the desired closing forces between the seal faces. So as the pressure drop through the porous media is likely to be on the order of 50% if the area described within the diameter of 164 equals 50% of the area at the bearing face the forces would be equal. This does not account for forces from other pressure differentials or from the biasing springs or flexures which should also be considered and designed for as one competent in the art could well do.

Figure 1F:
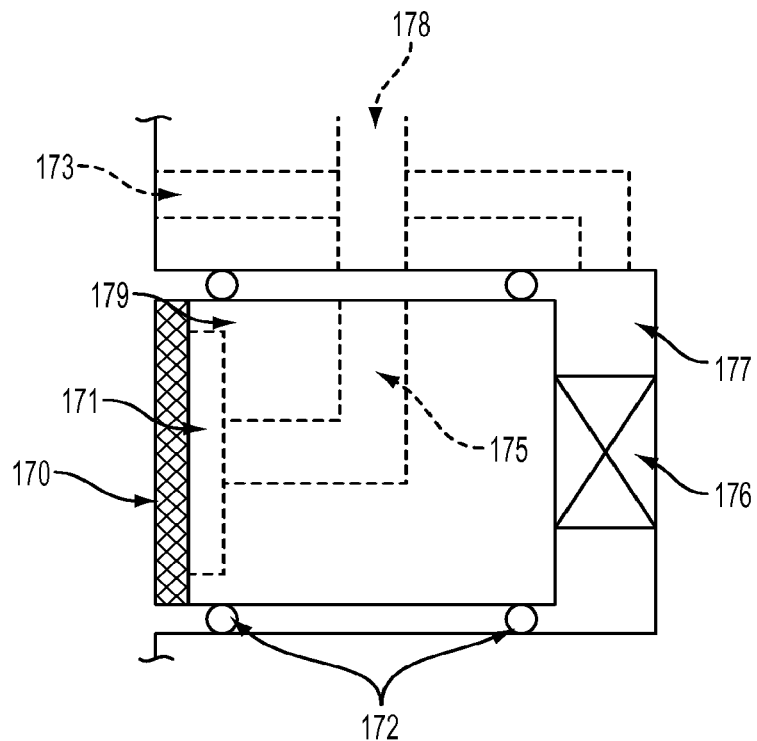

In FIG. 1F a primary ring 179 with a porous face 170 and a Plenum to distribute air pressure behind the porous face 170 is constrained between O-rings 172 within the seal cartridge. The air pressure input for the bearing functionality through port 178 conducts to port 175 before reaching Plenum 171. Vent 173 is used to be sure that pressure meant for the air bearing face is isolated exerting a force on the back of the primary ring. In this way only the spring 176 or diaphragm forces will urge the primary ring towards the mating ring.

Figure 1G:
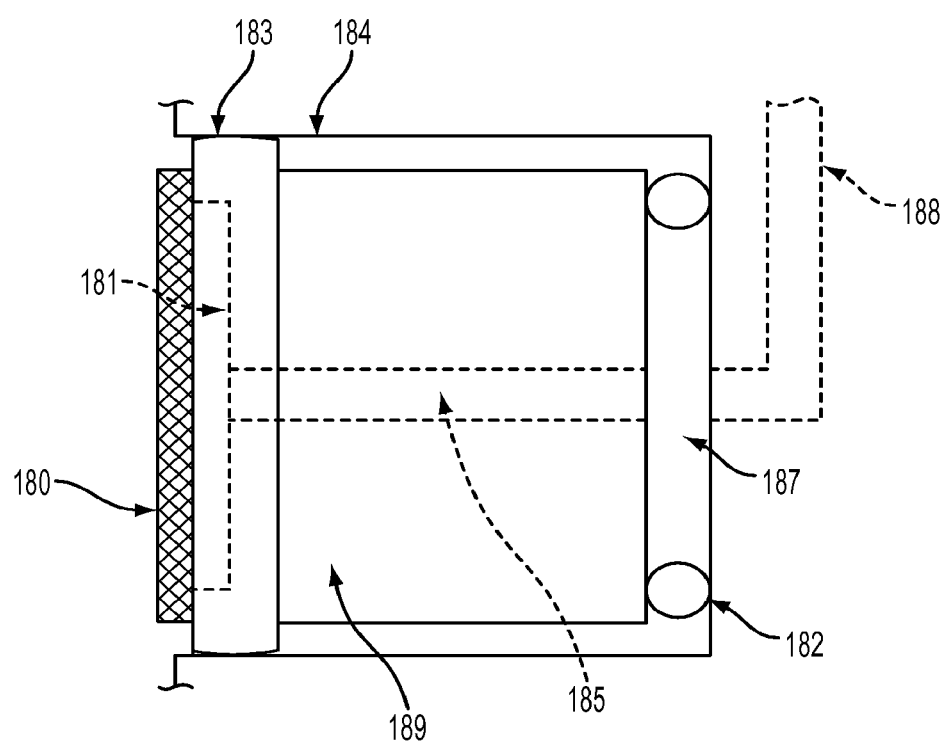

FIG. 1G shows a primary ring 189 with a porous face 180 and a Plenum 181 to distribute air behind the porous face 180 is constrained in the seal cartridge via an O-ring 182 and a Torus 183 (a segment of a sphere or a curve with constant diameter) cooperates with a close fit inside of the seal cartridge diameter 184. Air pressure to the bearing is introduced though port 188 and communicates to port 185 though another plenum 187 then the plenum 181 to the porous media 180.

Figure 2A:
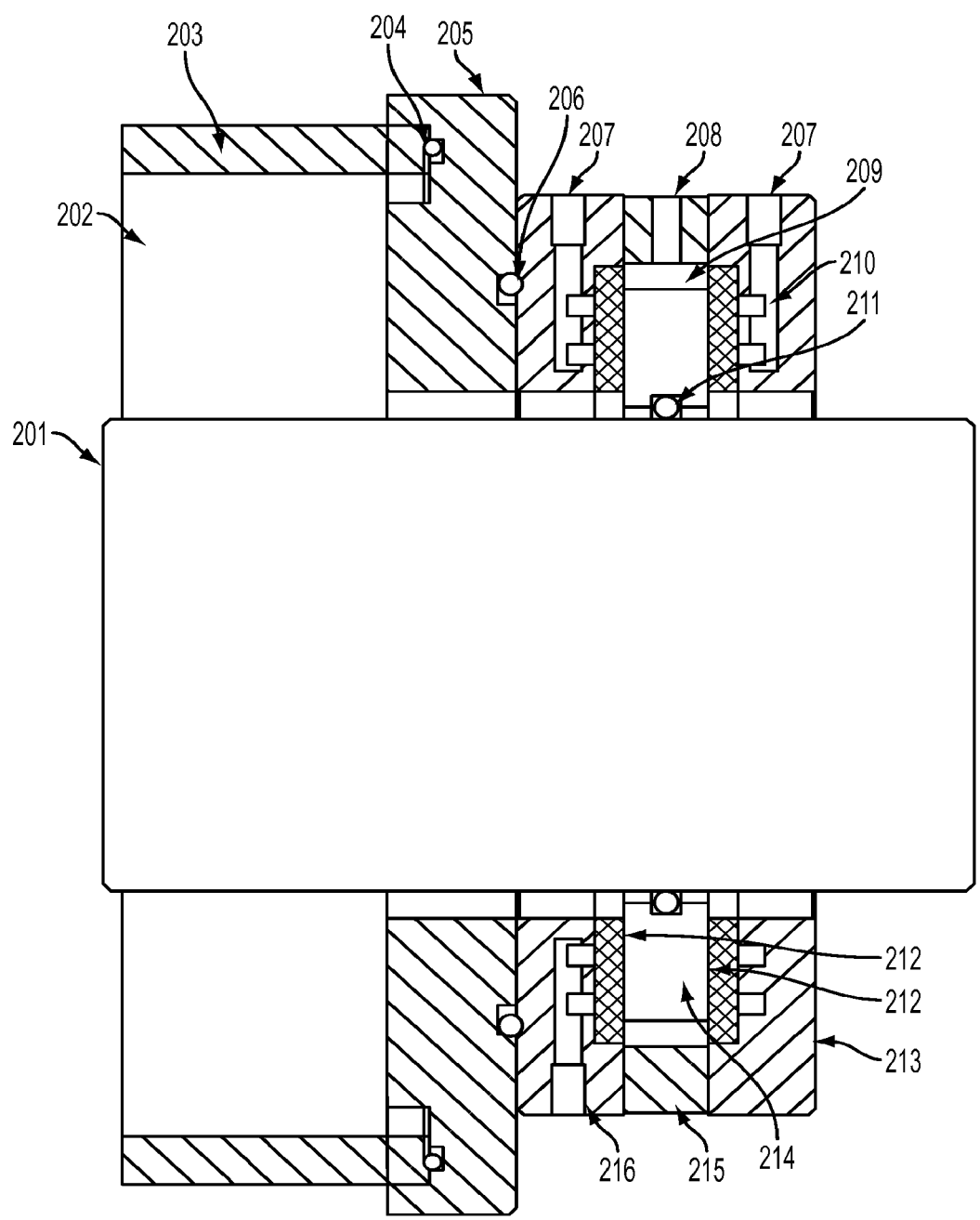

As shown in FIG. 2A, a shaft which may rotate at high speeds 201 has a runner 214 coupled to it via an O-ring 211, O-rings or another mounting mechanism as described in other attached figures. O-rings provide axial compliance to the runner to allow it to find center between the air bearing faces and provide for small axial displacements of the shaft. If the runner is hard mounted to the shaft some axial compliance should be designed into the stationary components. Examples of hard mounting the runner to the shaft may include using a mounting ring that is fixed to the shaft by set screws or using a shoulder and bold. The runner is free to move radially between the air films. 202 represents a volume on one side of the seal, this could be a gearbox, motor-generator housing, or a process fluid or gas such as a mixer, refiner, water pump or gas pipeline compressor as examples. 203 would represent the casing or the housing. 205 illustrates that there might be an adapter plate that would employ a stationary O-ring seal like 204. The seal body itself with mount up to the casing housing or adapter plate as shown including a potential O-ring seal 206 at that interface. The seal itself comprises two rings 213 and 216 with annular and opposed air bearing faces 212. The rings are separated by a spacer 215 which has axial dimensions similar to the runner 214. The spacer also provides for a vent or drain 208 to atmosphere so that pressure does not build up in the volume between thrust faces 209. The spacer may be slightly larger than the runner or slightly smaller than the runner depending on the design objectives. A larger spacer would allow more clearance, a smaller spacer would provide for a clamping functionality in the event hydrostatic pressure is lost, in this case, and with the runner fixed to the shaft, the seal would act like a conventional contact face seal. The rings 216 and 213 which are comprised of a nonporous material or are sealed except for the intended bearing/seal faces, provide for conductivity of the hydrostatic fluid though port 207 and a labyrinth 210 to evenly distribute said fluid to the backside of the porous media or an area close to the intended faces. The porous media 212 may be comprised of graphite, carbon, silicon carbide, alumina or basically any sintered material. These materials are typically found as face seals and mechanical seals and as runners and runner faces and dry gas seals. Just instead of filling or sealing this porosity the porosity is used for air bearing functionality. Porous media air bearing compensation is only one potential solution, orifice, step, grove, inherent or pocketed compensation among other compensation techniques known in the art may be employed. Porous air bearings are known in the art and are described by the inventor in previous applications. Also methods for providing clean fluids at pressure are well-known and readily available.

Figure 2B:
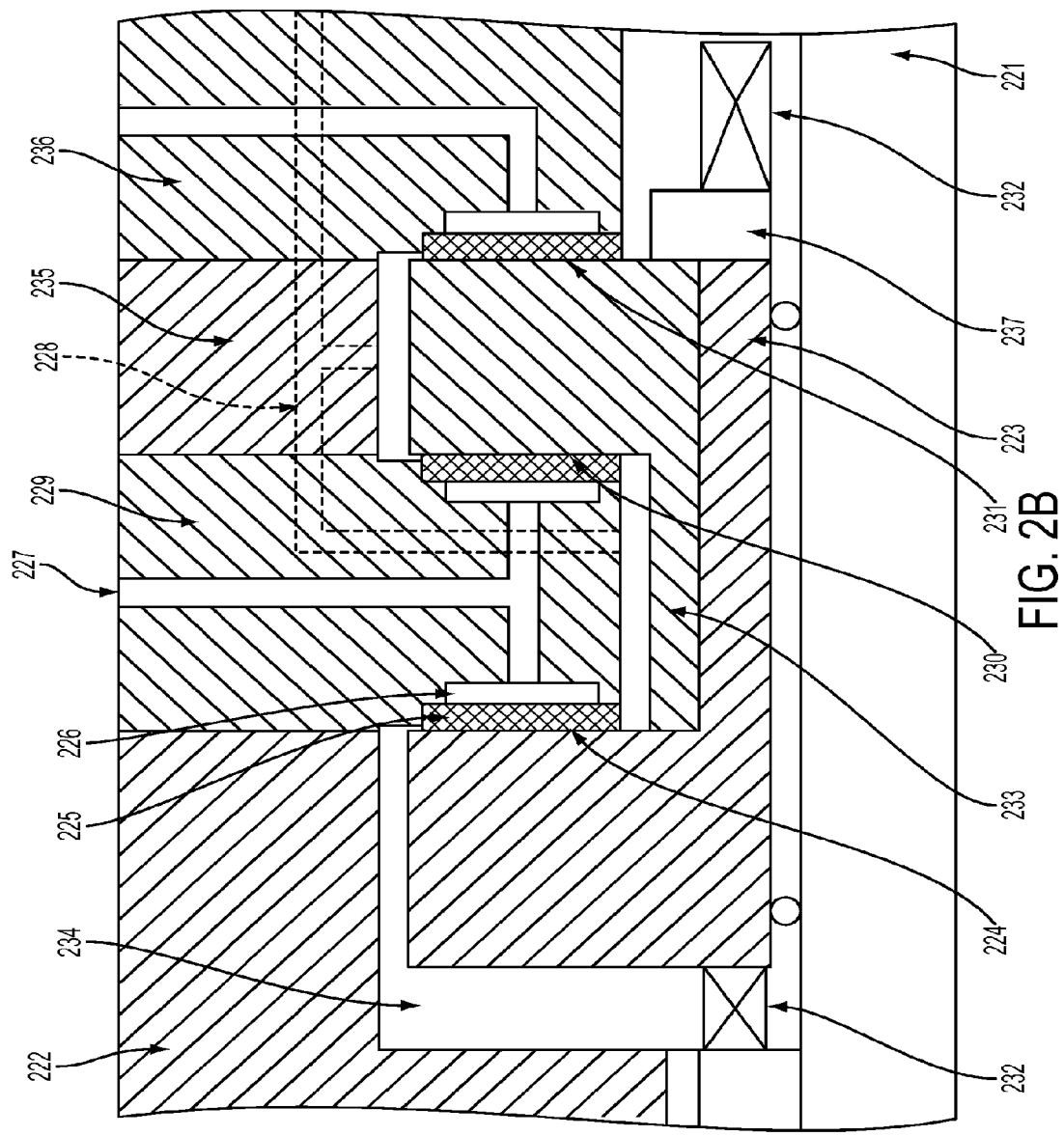

In FIG. 2B shaft 221 for a piece of Turbo equipment has a seal cartridge 222, within the cartridge is a mating ring 223 which in this case is a rotating flexible element. The mating ring as shown is integral to a sleeve but the sleeve and ring may be separate components. The mating ring with integral sleeve is supported axially on the shaft via Springs 232 and the mating rings 223 and 233 are locked together axially by clamping ring 237. The mating ring 223 runs against a stationary primary ring 229 which in this preferred embodiment has a porous bearing face 224 and the necessary labyrinth 226 and input porting 227 to create an effective hydrostatic gap using the porous media 225 as the restrictive element. In this embodiment as an example of a double seal there is a second mating ring 233 and a second primary ring face 230 on the opposite side of 229 from the other air bearing primary ring face. Both bearing systems are fed external pressure and vented using the same systems and porting. The volume between seal face 224 and 230 is vented though port 228, preventing a pressure build up there. The same is the case between seal faces 230 and 231, they are vented. It should be noted that some of the flow exiting seal gap 224 will flow to the process side. The amount would depend on the pressure differences. So if volume 234 is pressurized to 1000 PSI and the flow out of vent 228 is at ambient pressure most of the flow will be out of the vent rather than into the process. The input pressure to the porous media 225 should be 4 to 6 bar above the pressure it is sealing against so 73 bar to 75 bar. It is of course possible to regulate a cascading lower pressure to each of the successive faces so as to drop the pressure down over stages. If each stage has a 69 bar pressure drop the seal could effectively seal 207 bar.

A novelty here independent of the use of porous media is that the air bearing sealing gaps between the faces of the porous bearings on 229 in the inside facing surfaces of mating rings 223 and 233 is fixed at assembly. It is not a spring-loaded fit and so there is no possibility for a hang-up, as noted as a main problem in the current art by U.S. Pat. No. 7,823,885 to Droscher which leaves the seal faces open. The robustness of the porous media air bearing seal technology means that even if the mating rings get hung up on the shaft and there is an axial displacement of the shaft relative to the seal cartridge the bearing faces will not be materially damaged and the mating ring sleeve will move on the shaft. This effect can be increased by adding more mating and primary ring faces, bearing seal face 231 in primary ring 236 is an example of this. The thickness of 235 is fit at assembly. Additionally another porous bearing face could run on the opposite side of mating ring 223 in the space described by 234. This is taken to its logical conclusion in the teaching of FIG. 6A.

It will be recognized that the API suggests a number of different arrangements for seals and that these include face-to-face, back-to-back, double opposed, and tandem seals. In some cases flexible elements spin on the shaft and in some cases flexible elements are integrated into the Stator. Is meant and here illustrated that this porous air bearing technology can be employed in the faces of all these seal arrangements.

Figures 1, 2C:
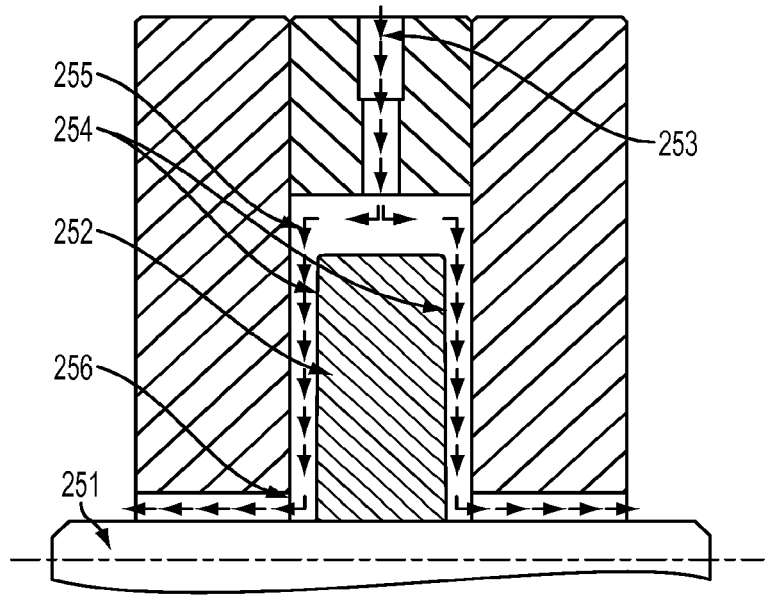
Figures 2, 2C:
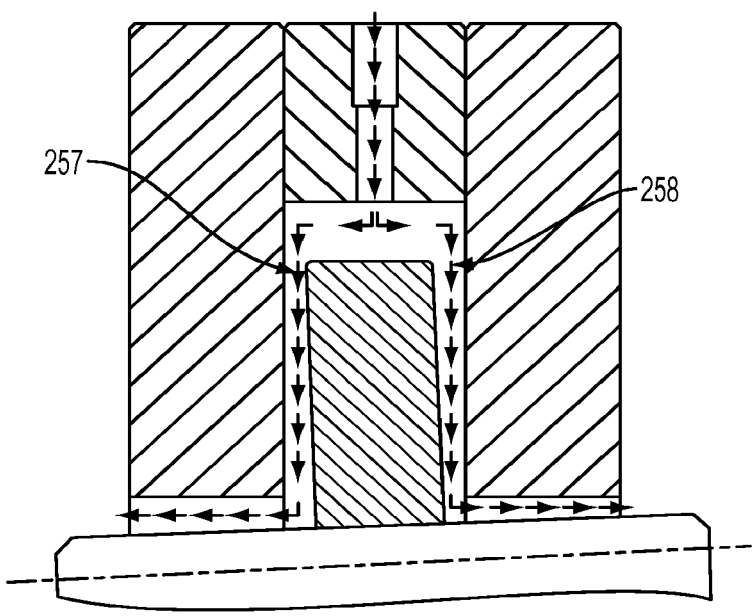

FIGS. 2C-1 through 2C-4 are meant to illustrate the advantages of externally pressurized porous media air bearings over aerodynamic bearings in gas seal applications. In FIG. 2C-1, we see the introduction of a seal gas at a higher pressure than process gas at port 253, the runner 252 rotating at a high speed with the shaft 251 has aerodynamic features 254 etched in its faces to help establish an air bearing film on each side of the runner. The seal gas flows into the gap from the outside edge 255 across the gaps to exit the lower pressure edge 256. In FIG. 2C-2, an axial or angular change in the shaft with respect to the Stator makes the gap on one side smaller 257, as the gap on the other side gets bigger 258. It is noted that the stiffness of the air films would resist such a motion, still such motions do occur. At this point the flow of seal gas to the side with the smaller gap 257 would be reduced as the pressure would take the path of least resistance which is the larger gap 258 on the opposite side. In this case where the runner is closest to the counter surface the flow is restricted and there is lower flow into the area where we would like to have the highest pressure in order to avoid contact. At the point of contact all the pressure and flow will be through the large gap side 258, driving the runner to the opposite side 257. This is an unstable situation. Although the hydrodynamic features may be attempting to pump air pressure into this area it is difficult to get air to flow into the small gap especially if it was more of an axial rather than in angular change.

Figures 2, 2C, 3:
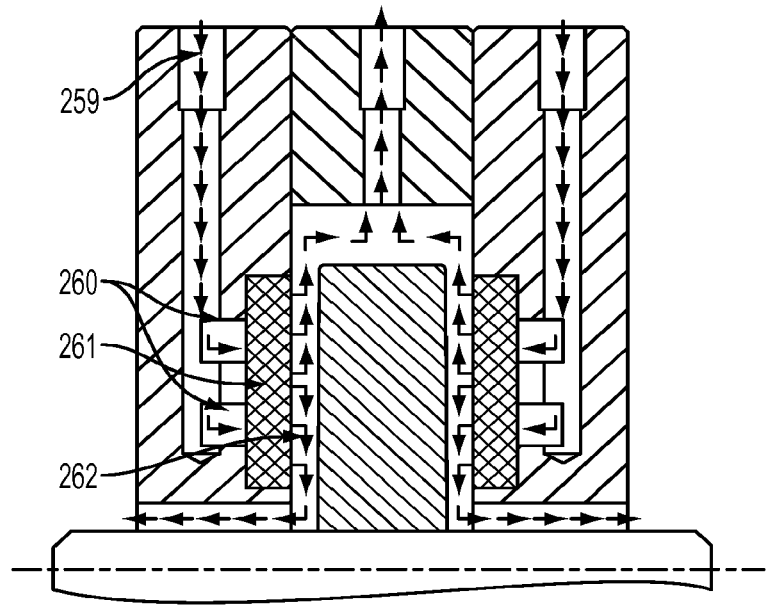
Figures 2, 2C, 3, 4:
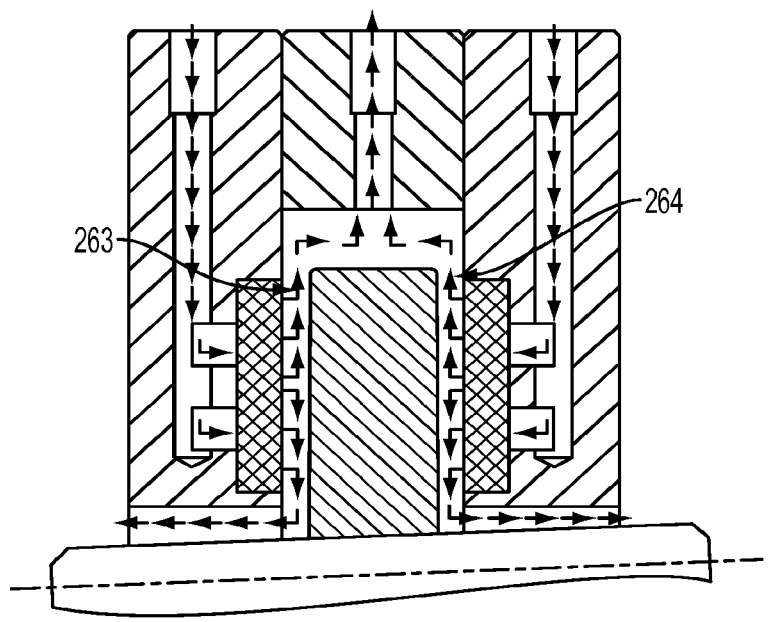

In FIG. 2C-3 high pressure gas is introduced through port 259, into the plenum 260, then through the porous media 261 which restricts the flow into the bearing gap 262, there are no features etched in the runner 263. With a similar axial or angular change in the position of the runner towards one of the bearing faces 263 the bearing pressure in the gap at 263 will automatically increase until the runner actually makes contact, at which point the pressure attempting to exit the porous media will approach the input pressure. The relative force between the runner and the bearing face is mitigated by the pressure attempting to exit the bearing face at 263. At the same time; the opposite side 264 has a lower pressure as the gap is larger and the restriction is coming from the porous media instead of the edge of the gap so the bigger gap results in lower pressure. This results in a naturally stable situation where the side with the smallest gap is always building the highest pressure and the side with the biggest gap is having the lowest pressure. In the aerodynamics seals illustrated in 2C-1 and 2C-2 the reverse is the case.

Figure 2D:
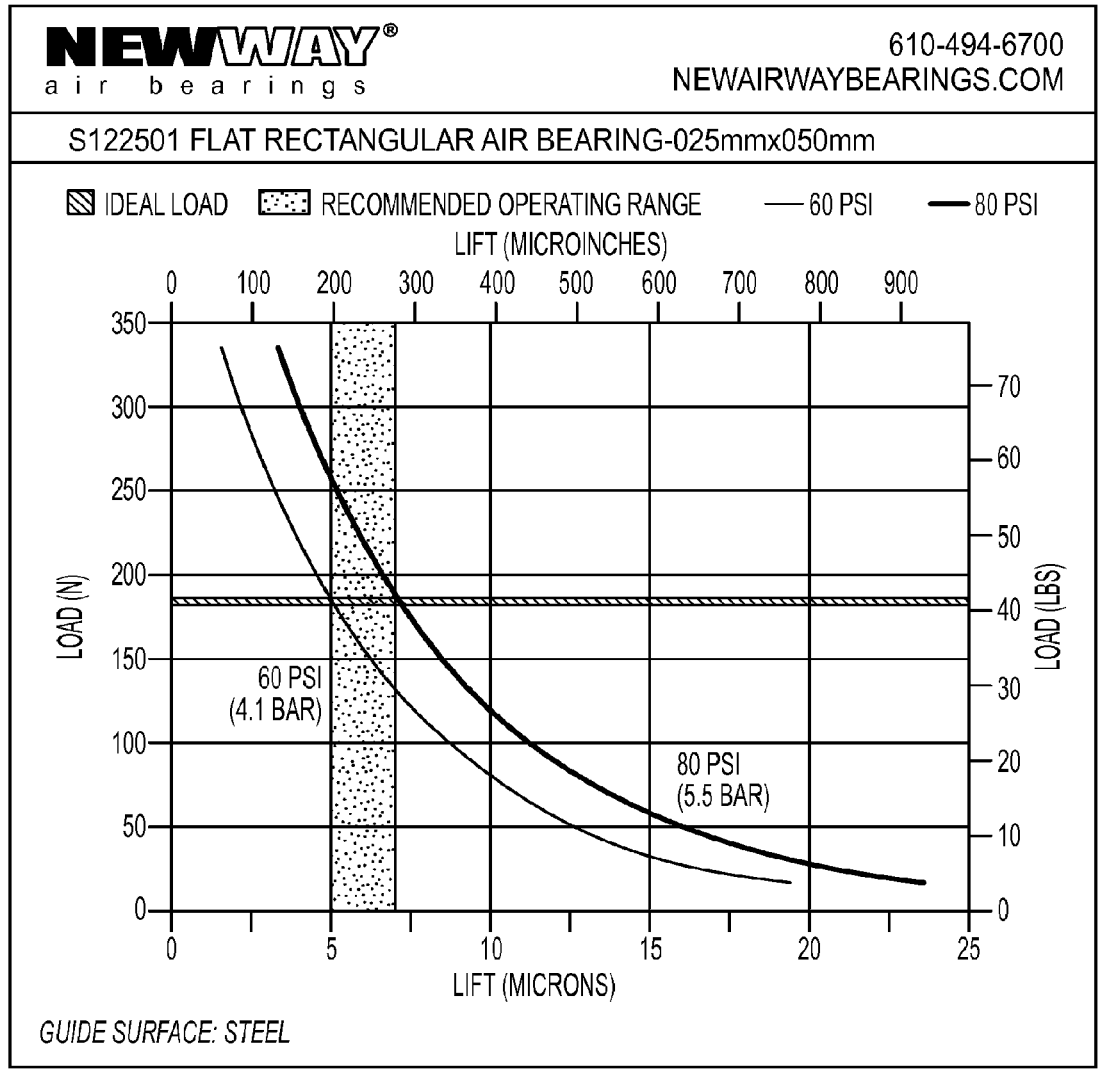

Looking to FIG. 2D, it can be seen that the stiffness of an air bearing film changes with its thickness. The thinner the air gap the higher the stiffness. The chart in FIG. 2D is a lift load curve; the slope of the curve is representative of the bearing stiffness at that point. A horizontal line represents zero stiffness and a vertical line represents infinite stiffness. Whether you are dealing with an orifice in the face of an externally pressurized bearing or the gap at the perimeter of an aerodynamic bearing, the smaller the gap is, the harder it is to get enough air to distribute across the full surface of the bearing. With the porous bearing the air is issuing from the whole face of the bearing directly into the gap, there is no issue with trying to get the air to flow across the gap. This makes the porous bearing a more robust gas bearing. Additionally it is worth noting the flow through a gap is a cubed function of the gap, so doubling the gap results in an eight fold increase in the flow. The stability of porous bearings allows such small air gaps with a high degree of safety and reliability, therefore they are preferred.

Figure 3A:
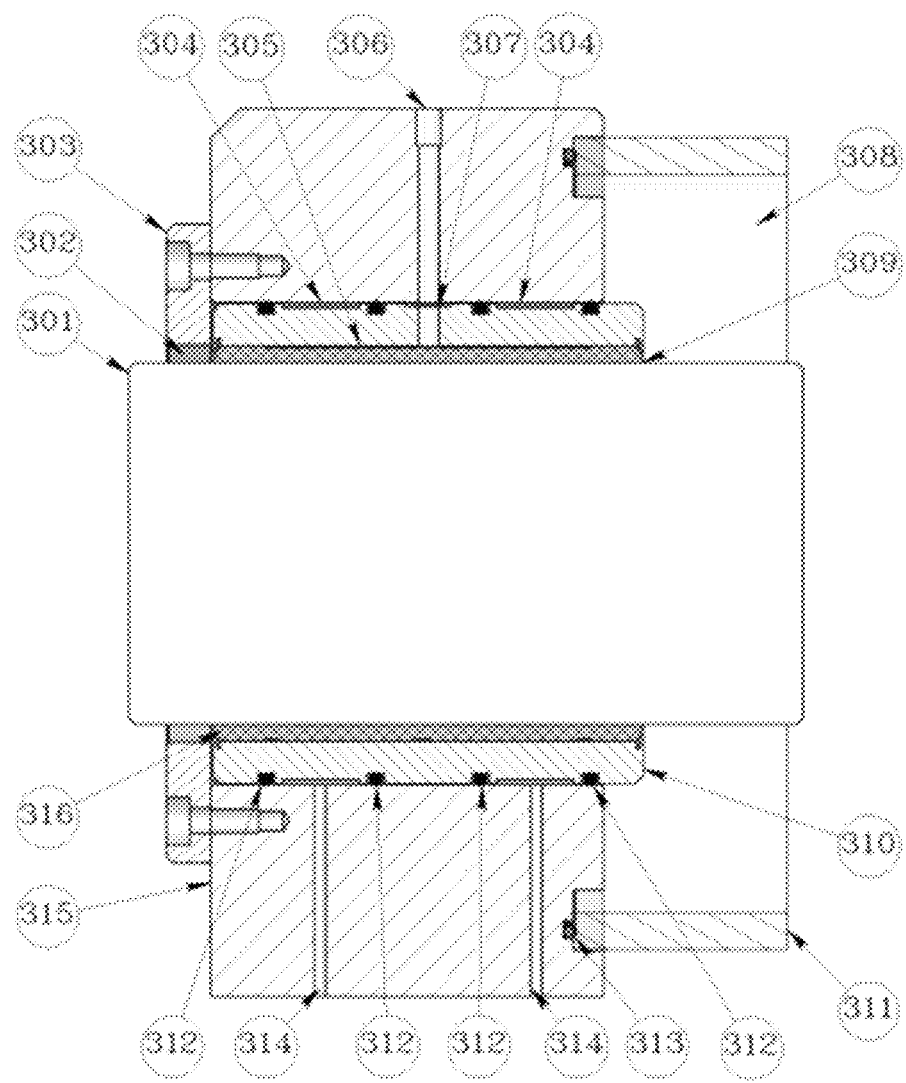

As seen in FIG. 3A, a shaft 301 which may rotate at high speeds is rotated inside of a stationary cylindrical bearing seal 310. Contamination or pressures that exist in volume 308 are sealed and denied egress into the gap 309 by hydrostatic pressure exiting from the gap 309. The housing or casing represented by 311 may be equipped to receive the cylindrical air bearing seal directly or an adapter block 315 may be used, in which case an O-ring 313 would provide a static seal at that interface. In this embodiment it is preferred to have a retainer 303 on the low pressure side of the seal and clearance 302 should be provided between this retainer in the shaft. A passageway 306 is required to conduct high pressure fluid to the cylindrical seal assembly. O-rings 312 can provide multiple functions, one of these functions is to seal plenum 307 so that this high pressure fluid may be conducted into the seal body 310 through the passageway 306 without directly connecting a fitting to the seal body. These O-rings also may be used to provide for radial and angular compliance, the shaft is completely free to move axially on the air film. The O-rings 312 may also be used to contain epoxy which may be injected through a hole 314 which will fill the cylindrical gap 304 between housing or mounting block and the seal body mounting it rigidly if desired. With air pressure on, the seal will self align to the shaft which should be held on the design centerline of the machine as the epoxy cures, hard mounting the seal in place. (See new way air bushing mounting information).

The high pressure fluid entering through Aperture 306 and finding its way through the hole in the seal body will be distributed axially and radially between the seal body 310 and the porous media 316 by a labyrinth 305 which may be in the porous media or the seal body. Although porous media compensation is the preferred embodiment other compensation methods are possible. Porous media air bearing compensation is only one potential solution, orifice, step, groove, inherent or pocketed compensation among other compensation techniques known in the art may be employed. Porous air bearings are known in the art and are described by the inventor in previous applications. Also, methods for providing clean fluids at pressure are well-known and readily available. The porous media 316 may be comprised of graphite, carbon, silicon carbide, alumina or basically any sintered or porous material. These materials are typically found as face seals and mechanical seals and as runners and runner faces in dry gas seals. Just instead of filling or sealing this porosity which is a common practice the porosity is used for air bearing functionality.

Figure 3B:
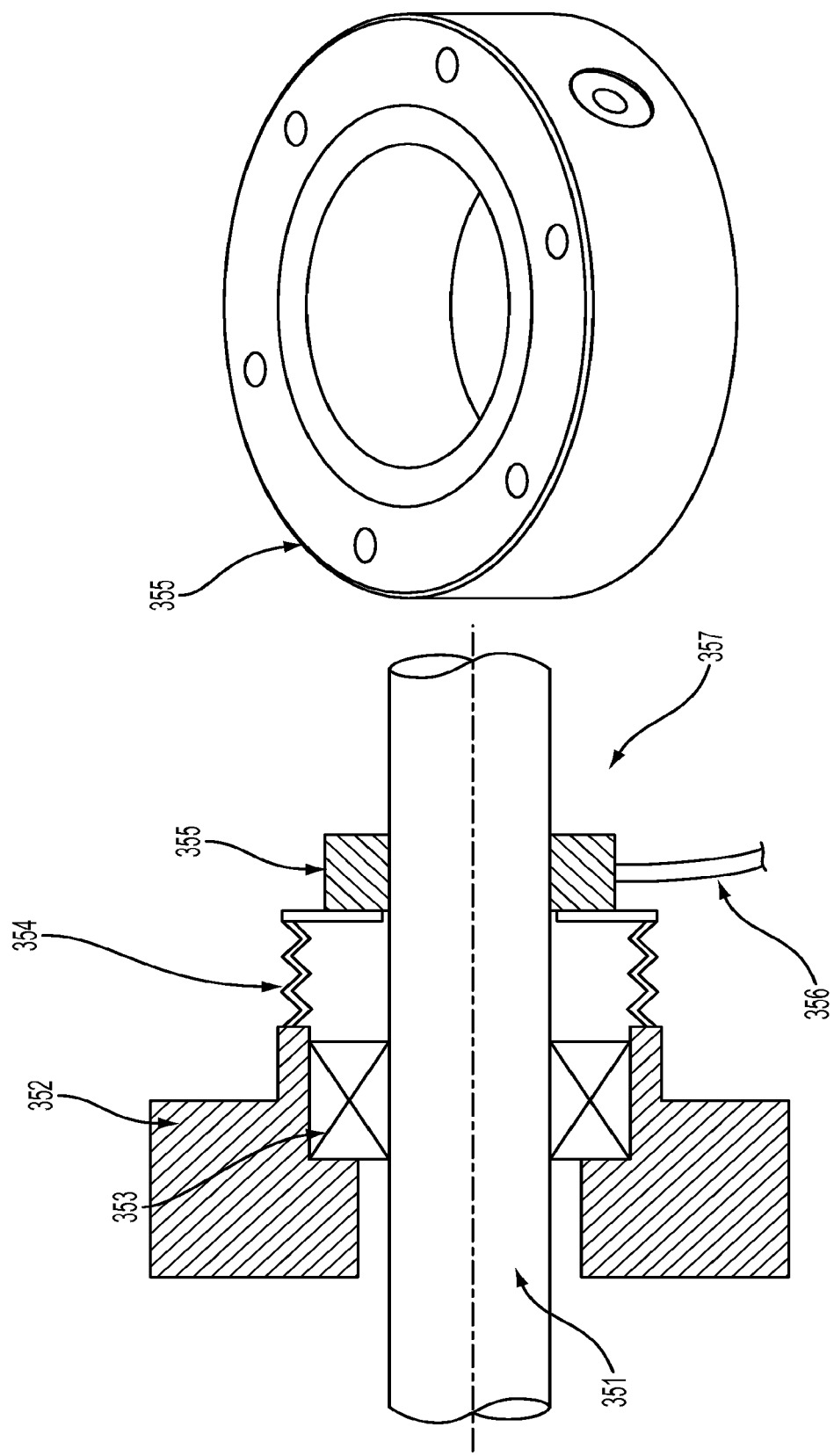

With reference to FIG. 3B; there is a shaft 351 and a housing 352 which are coupled through a bearing system 353. Being desirous to isolate the bearing from the process or environment in area 357 an aerostatic gas seal 355, consistent with the illustration in FIG. 3A (except in this example the aerostatic pressure is plumbed through a flexible tube 356) just shorter axially, is coupled to the shaft 351 through a high-pressure air film which supports the seal 355 in a noncontact fashion with respect to the shaft. So the shaft may rotate at a high rate of speed with virtually no torque transmitted to the seal because of the low shear forces in the air gap, but the seal is able to follow motions of the shaft without contact due to the radial stiffness of the air film. The mechanical bellows allows the seal to follow the shaft rather than keeping it rigidly coupled to the housing. Additional methods for providing compliance are detailed in FIGS. 7A-10B.

In contrast to labyrinth seals cylindrical air bearing seals are coupled to the shaft via the stiffness of the air film. In the example of FIG. 3B the bushing seal is supported by the spinning shaft it is sealing on. This allows for eliminating alignment issues found in labyrinth seals. The seal is stationary with respect to the Stator and connected to it through some sort of flexible bellows arrangement 354, diaphragm or an axial O-ring as examples of compliant mounts. It would also be possible to take a circumferential seal and mount it between axial face seals as described in FIG. 2A and 8A.

Bearing isolators that look like FIGS. 2A, 3B or 7A-10B can be found from seal manufacturers such as GGB, Waukesha and Crane, which are examples of other seal manufacturers employing the current state of the art in compliant mounts that allow for the shifting of the center of the shaft, angular excursions of the shaft and axial displacements. In some cases these bearing isolators used pressurized air or water though an uncompensated annular grove to help affect the seal. These are characterized by high flows and low pressures due to their large gaps and lack of compensation.

Figure 4B:
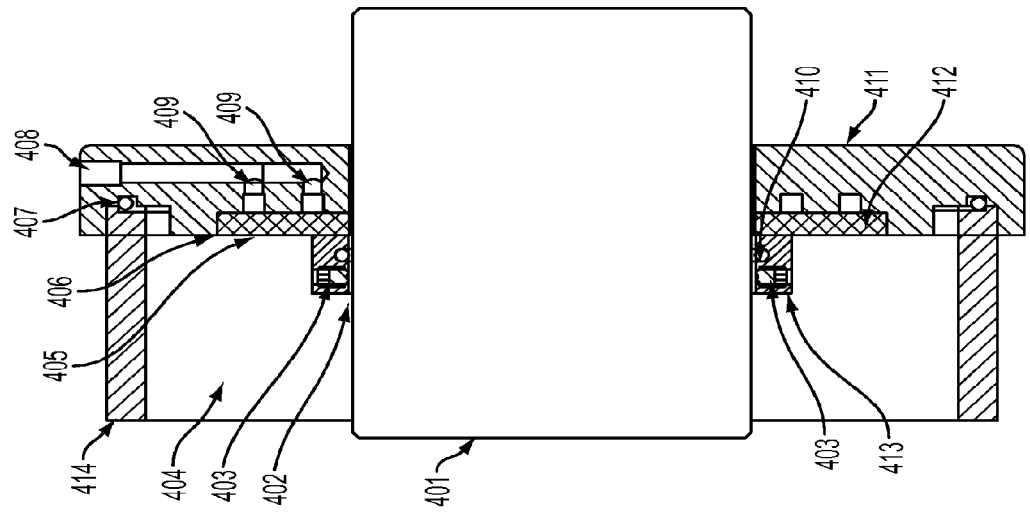
Figure 4A:
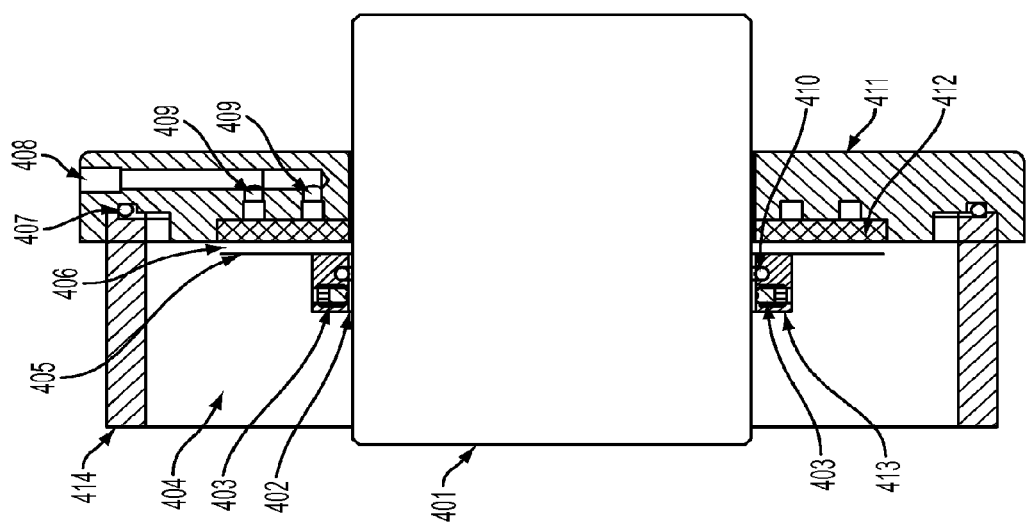

In FIG. 4A, a shaft 401 which may rotate at high speeds has a blade runner 405 hard mounted to it using a mounting ring 413 which is fixed to the shaft by set screws 403 and or a shoulder. Examples of hard mounting the runner to the shaft may include using a mounting ring that is fixed to the shaft by set screws or using a shoulder and bolt. An O ring 410 may be employed to seal clearance at 402. You will notice that there are two illustrations in FIG. 4; in view A the blade 405 is not up against the porous seal bearing face and the gap 406 allows for a view of the blade runner 405, in view B, the blade runner is in place and the gap 406 between it and the porous face 412 is as it would be in operation, less than 25 microns. The blade itself may be hard mounted directly to the shoulder if the shaft is so equipped with a shoulder (a shoulder would be the axial face created by a step in the diameter) see FIG. 6A. The blade runner is characterized by being thin axially and so differentiated from conventional runners. The blade may be any thickness but likely between 0.1 and 1 mm thick. This blade runner has the advantage of being light weight and so it has a minimal effect on the moment of inertia of the shaft and on potential imbalances caused by the runner. Because the pressure to be sealed in volume 404 is the same everywhere in the volume it acts uniformly on the back of the blade flexure, urging it against the air bearing seal face with constant per-unit area force. For this reason it is not necessary to have a heavy rigid runner connected to the shaft. The gap 406 will vary but a force equal to and opposite forces existing in volume 404 will be generated in the air gap. This embodiment may be well suited for replacing brush type seals especially in turbines designed as aero engines. As it would seal more effectively, have zero or at least relatively low friction or wear and occupy significantly less space axially.

High pressure gas some bars higher than what exists in volume 404 is introduced into port 408, which conducts the pressure to the Plenum 409, which distributes the air pressure uniformly to the backside of the porous media 412 which will create a pressure in the gap 406 at its face and between the runner 405

The volume 404 represents a volume on one side of the seal, this could be a gearbox, a motor-generator housing, or a process fluid or gas such as a mixer, refiner, water pump or gas pipeline, or a seal between compartments, impellers or stages in a piece of rotating equipment like a compressor as examples. 414 would represent the casing or the housing. There may or may not be an adapter plate such as shown in FIG. 2A number 205. The seal body itself 411 would likely mount to the housing casing or adapter plate with an O-ring seal 407. The seal body in FIG. 1A refers to a seal that would be lightly loaded, it should be recognized that the seal body and its mounting maybe designed to be stiff enough so that it does not deform significantly under the pressure differentials that are being sealed. Alternatively it may be designed so that it does flex and so may flex to cooperate with the conformable nature of the Blade Runner which is essentially a flat spring steel flexure.

Figure 5A:
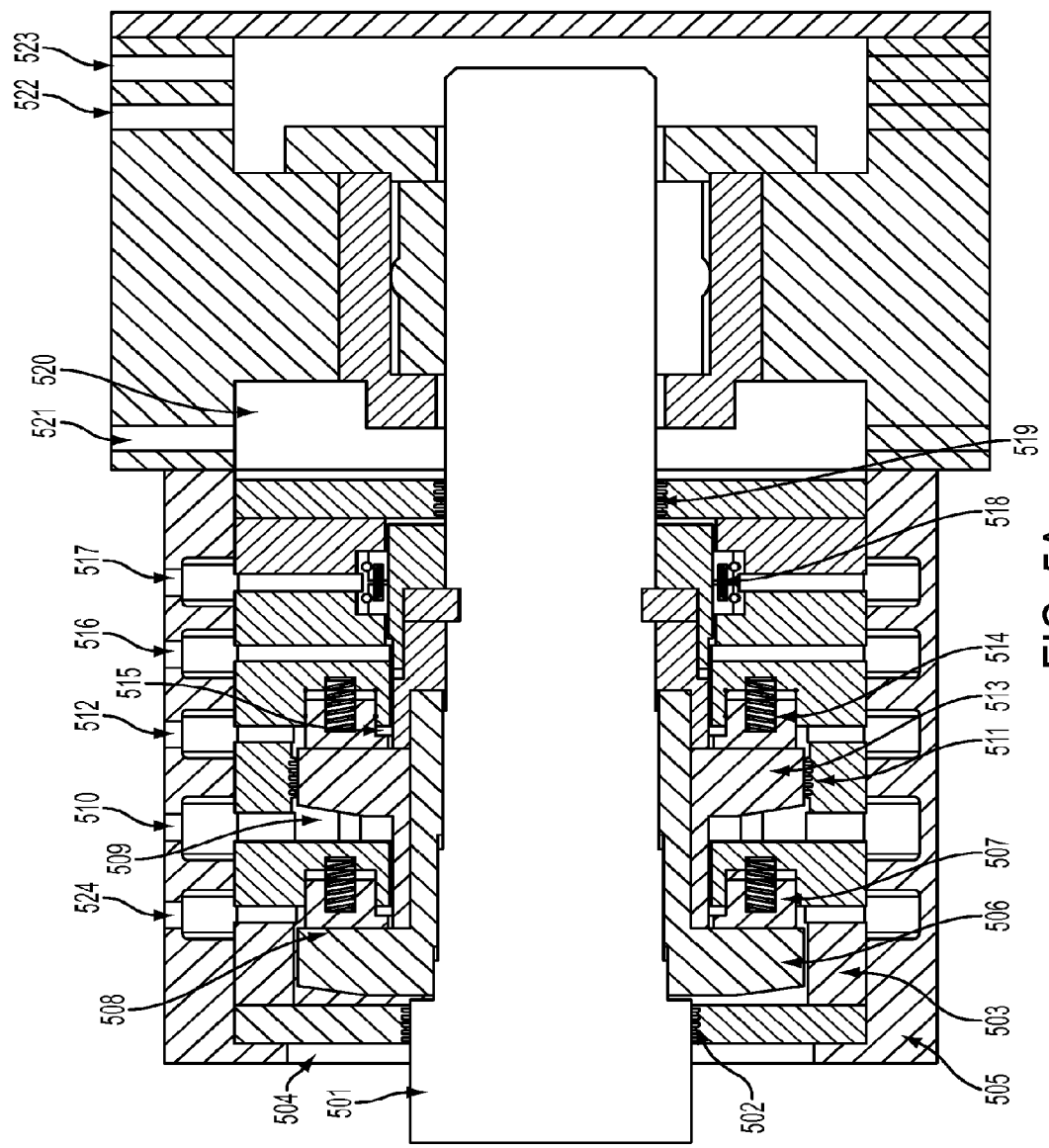

In the prior art of FIG. 5A, a conventional centrifugal compressor employs a sealing and bearing system described here (but this is descriptive of many other potential applications in rotating equipment); shaft 501 comes from the compressor camber 504 though a labyrinth seal 502, into the seal cartridge 503 which fits into the seal chamber within the compressor casing 505. Then a face or dry-gas seal affected between the primary ring 507 and mating ring 506, which we will refer to as the primary seal 508. Between the labyrinth 502 and the primary seal 508 a buffer/flush gas is introduced though port 524, most of this gas flows back to the process side as the labyrinth seal has a high degree of flow even with only a bar's worth of pressure difference. This buffer gas is important to keep the primary seal gap clean. Some of the gas flows across the mechanical face or aerodynamic primary seal 508 and into the Plenum 509, finally exiting through vent 510. Then there is a seal gas or inert gas introduced through port 512, as before most of this flows through labyrinth seal 511 and out vent 510. Some of this gas does flow through the secondary seal made up of the mating ring 513 and primary ring 514. This is because the pressure being introduced at 512 is higher than the pressure in the volume 515. This flow is exhausted through vent 516. Then there is a separation gas introduced through port 517 which flows through the separation seal 518. Some of that flow migrates into volume 515 and vents through 516 and some of that flow makes its way through labyrinth seal 519 (if so equipped) and into the bearing chamber 520. So we have process and buffer gas flowing out of vent 510 and this is mixed with seal or inert gas that was introduced through 512. This needs to be reprocessed or sent to flare. The gas flowing across the secondary seal and into volume 515 mixes with the separation gas being introduced through 517 and then exits out of vent 516 and also needs to be sent to flare or otherwise processed or reported as an emission. Additionally separation gas flowing into the bearing chamber 520 will find its way out vent 521 and becomes yet another environmental headache. The bearing chamber has oil pumped in at pressure through port 522, the oil then needs to be drained out through port 523 (that may be positioned at the bottom) filtered and cooled to control its viscosity which important because it is very temperature sensitive. With all of those tubes coming and going from each end of the compressor, more than one operator thought he was looking upon Medusa.

Figure 5B:
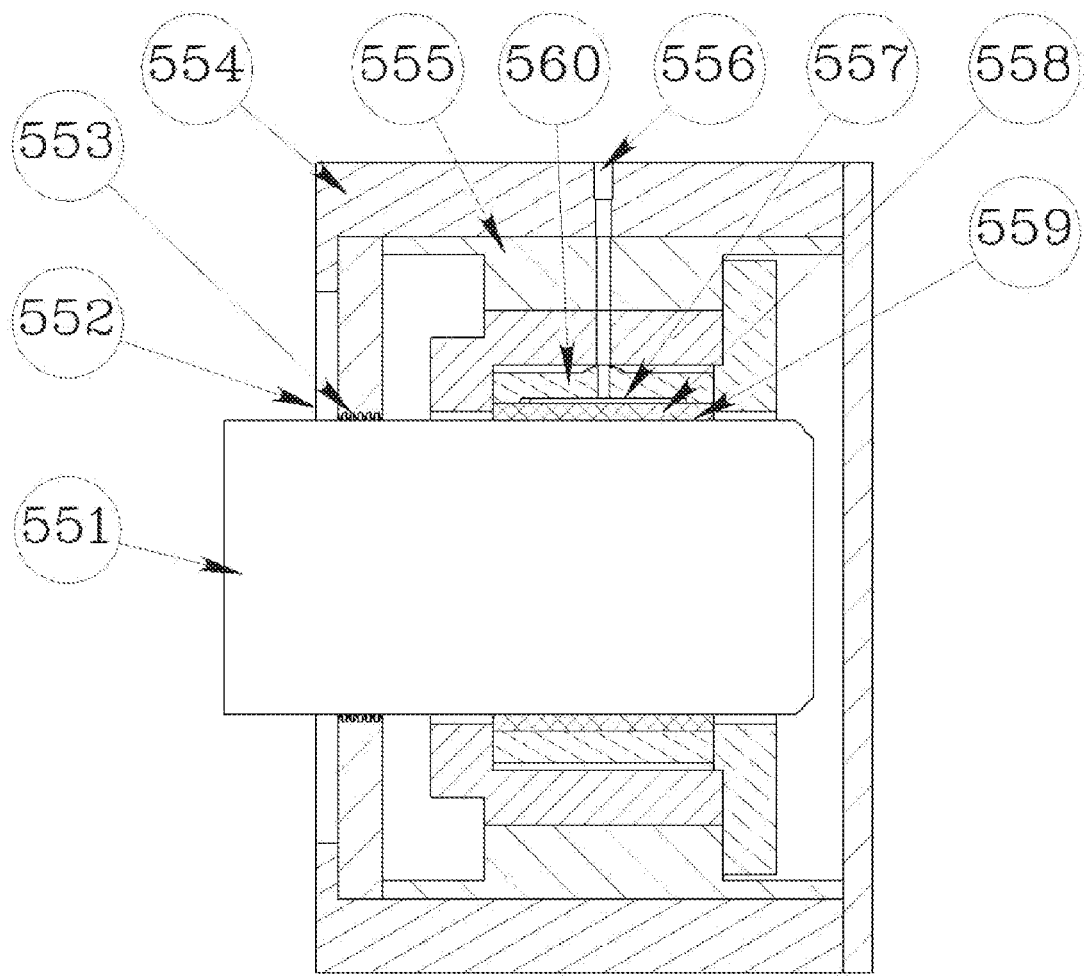

In the preferred embodiment shown in FIG. 5B, the services, complications and environmental headaches listed above are eliminated by the following novel teachings. With reference to FIG. 5B please notice that oil has been removed as a lubricating medium for the bearings supporting the compressor shaft. Instead gas bearings operating on the gas being compressed in the compressor are used to create an aerostatic air bearing support 560 for the shaft 551. The bearing cartridge 555 and the bearing chamber and or seal chamber in the compressor casing 554 may change in new designs to take advantage of the much more compact design that is possible, but this is not necessary as the gas bearing cartridge can fit in the same space that the oil bearing cartridge fits into.

The preferred embodiment is to use a porous media restriction 558 at the face of tilting pad externally pressurized air bearings 560. These bearings can be fed using the same buffer gas that had been employed in the prior art but this buffer gas is instead pumped into the externally pressurized air bearings 560. The bearings require a higher pressure differential, likely in the range of 4 to 20 bar above the pressure on the other side of labyrinth seal in volume 552, but the volume of this buffer gas flow, that is now bearing gas, is dramatically less than was required of buffer gas in the prior art, likely less than one cubic foot per minute per bearing. The buffer gas may be taken from the high-pressure side of the pump, or the suction side, conducted through filters or dryers, compressed if taken from the suction side, and then introduced through port 556, into the bearing 560, distributed to the labyrinth 557 restricted by the porous media 558 and then finally exiting under pressure through the final bearing restriction, gap 559. After the gas has exited the bearing gap 559 it acts to raise the pressure in the bearing compartment slightly as the used gas will flow back into the process through the labyrinth seal 553 or some other ring or separation seal that may be used in that location.

All vents are eliminated, there is no reason to have a process flow into the bearing chamber and there is nowhere for it to go. This eliminates having to flare or report vents to atmosphere, and is a huge environmental advantage. And as there is only one gas to deal with, services are dramatically simplified, improvements in maintenance costs and downtime and the reduction in capital costs as seal services capital cost can be a multiple of the cost of the seal. Safety is also improved, as the elimination of venting also eliminates the possibility of entraining oxygen into flammable gases being compressed or allowing dangerous gases to escape.

Rotor dynamics are dramatically improved by the use of this invention, the length of shaft that had previously been consumed by seals may be eliminated, dramatically stiffening the shaft 551. The diameter of the shaft can be increased due to the higher speed capability of the gas bearings again stiffening the shaft and providing more area for squeeze film damping in the gas bearing.

The environmental problems and mess associated with oil are eliminated, and there are no more oil leaks. No oil can make it to a face or dry gas seal and carbonize. Oil no longer controls the temperature which the bearing compartment can operate at. Gas bearings may operate at the most extreme temperature ranges, from cryogenic to supper heated steam. It is noted here that conventional techniques for gluing porous media 558 to the stainless steel or aluminum bearing housings 560 is not appropriate for extreme temperatures.

The compressor or also in the case of a gas turbine or large generator will have the rotor supported on a frictionless gas film even at zero RPM. This reduces the risk at startup and shutdown, allows for slow roll and standby operations without danger of seal hang-ups or bearing damage and enabling frictionless startups and shutdowns.

Because of the excellent aerodynamic properties available from the smooth porous face, external pressure to the bearing maybe often turned off once the compressor or turbo machinery is at sufficient speed, as at that point the shaft will be supported on aerodynamic effects. So the auxiliary compressor (if so equipped) may be run only at startup and shutdown, or slow roll conditions. If this auxiliary compressor failed during operation it would not affect the operation of the main compressor and the rotor could spin to a stop in a loss of pressure without damage due to the excellent tribological properties of the steel shaft on a carbon graphite bearing face. Additionally the technology is appropriate for canned compressors targeted towards subsea compression as the bearings can take their pressure from the high pressure side of the pump and have acceptable life as plain bearings in the start stop cycles. This is a much simpler and more compact way of eliminating oil than magnetic bearings.

But without sealing—and without venting—the bearings operate under extreme pressures. If the suction pressure of the pump is 100 bar, and the output side of the compressor was 200 bar, then the bearings could be fed at 106 bar and the flow through these bearings becomes the buffer gas. Bearings that operate in a 100 bar environment, actually only see a 6 bar pressure difference.

Figure 6A:
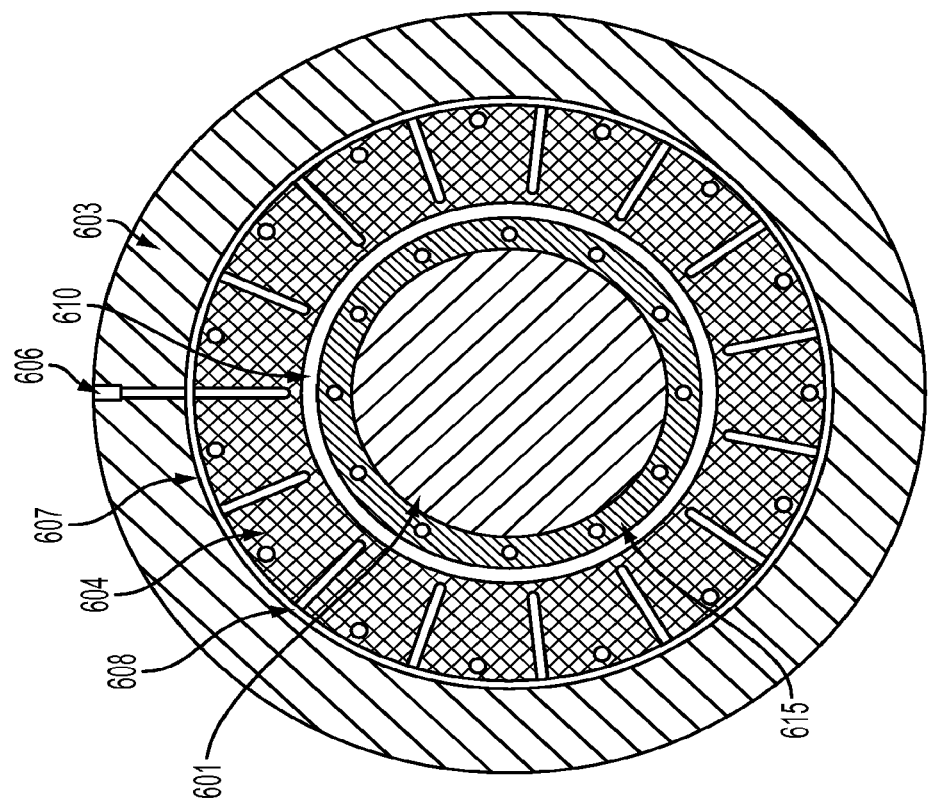
Figure 6A:
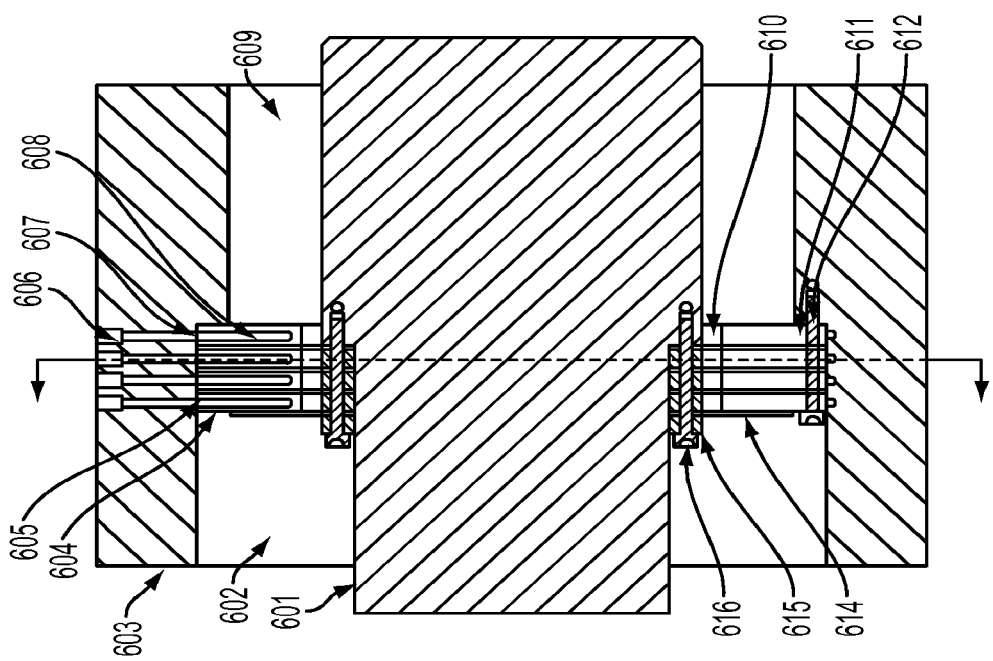
Figure 6B:
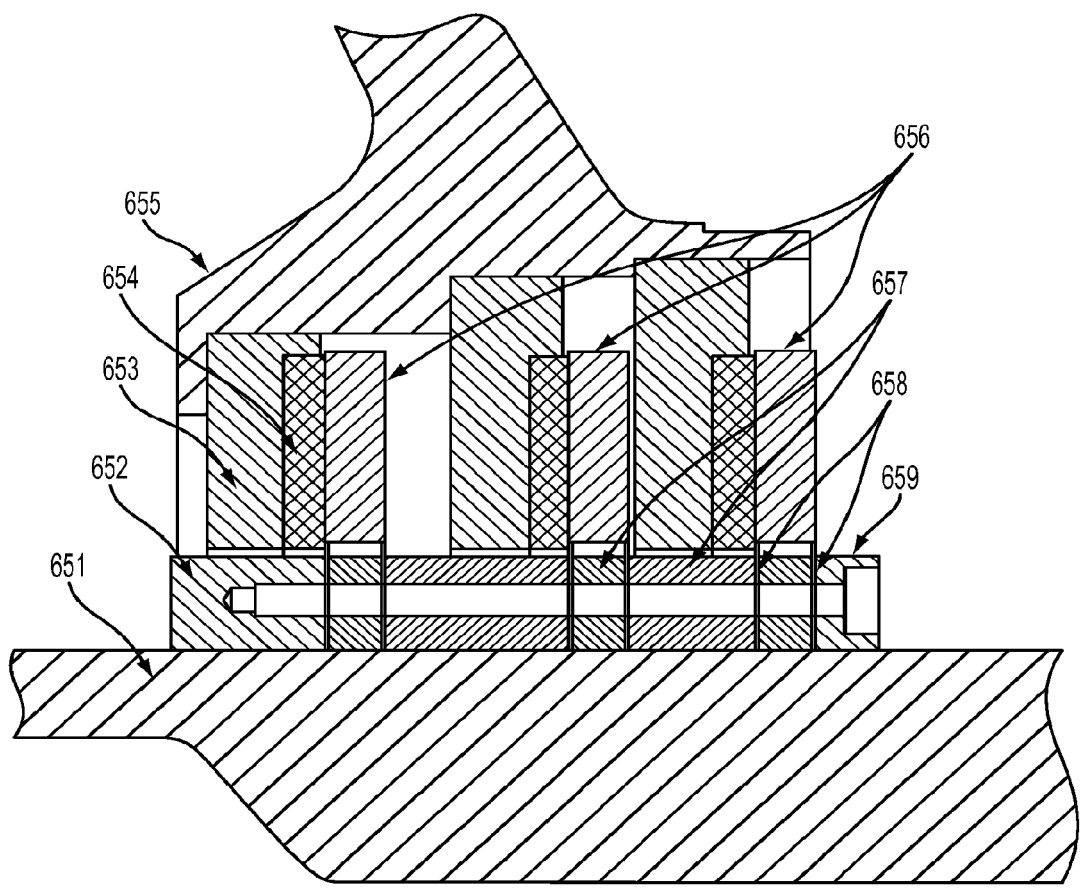

As shown in FIG. 6A, a shaft 601 which may be turning at a high velocity has connected to it multiple thin blades. These blades 614 may be hard mounted to the shaft 601 via a shoulder and bolt 616 and are separated from one another by precision spacing rings 615. Examples of hard mounting the runner to the shaft may include using a mounting ring that is fixed to the shaft by set screws or using a shoulder and bold. The porous bearing seals 604 are connected to the Stator 603 via a shoulder and bolt 612. The porous bearing seals 604 are also separated by precision spacers 605 approximately the same size or slightly thicker, but preferably not more than 10 μm thicker, than the Blade Runners. There is clearance 610 between the inside diameter of the porous bearing seals and the outside diameter of the shaft. There is complementary clearance 611 between the outside diameter of the Blade runners and the inside diameter of the Stator. This clearance provides for radial motion of the shaft. If a pressure differential exists between volume 602 and volume 609, for instance a higher pressure in volume 602, that pressure will act against the first blade runner urging it against the first porous bearing seal. But because higher pressure is being introduced through ports 606 and this pressure is conducted circumferentially by groove 607 and then radially through the porous bearing seal by radial hole 608. This pressure then conducts through the porous media and the face between the blade and the bearing creating a separating force that is also a seal.

Regarding illustration 6B; this embodiment is likely pertinent to aero engines as may be found on jet airplanes and or gas turbines that are employing brush or centrifugal seals. These contact type seals are a maintenance issue, they create friction and heat which cause efficiency losses and they are noisy. These issues are in large part solved by employing porous carbon air bearing technology. Bearing technology is taught in multiple other locations within the specification. The specific arrangement has a turbine shaft 651 fitted with a mechanism to retain runners which are flexure mounted to the shaft using parallel flexure technology. These runners 656 cooperate with a stationary air bearing seal 653 which in this preferred embodiment uses porous media compensation 654. The stationary part of the seal is mounted to the engine/compressor/generator housing 655 using conventional techniques similar to what would have been employed to mount the stationary section of the friction based seal. Spacers 657 are used to approximately locate the runners axially with the stationary parts of the seal and key off of 652 that is connected to the shaft and secured by 659. Parallel flexures 658 allow the runner to translate axially with respect to the shaft, which will happen for instance under the acceleration of take off, and yet remain parallel to the face of the stationary part of the seal.

Figure 6C:
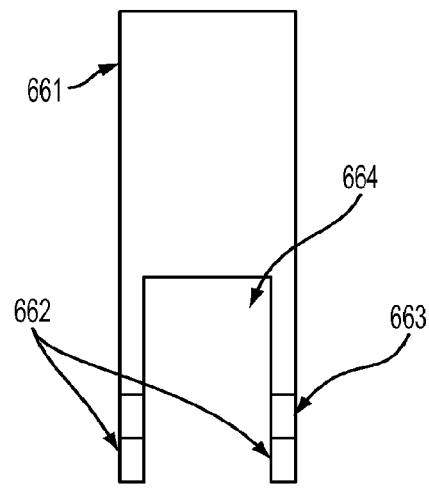
Figure 7A:
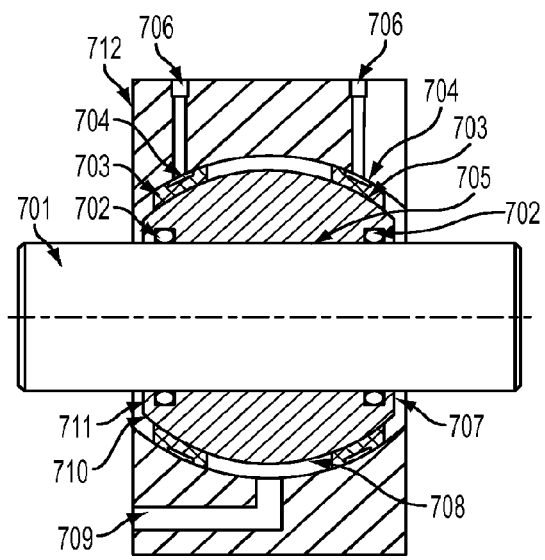
Figure 7B:
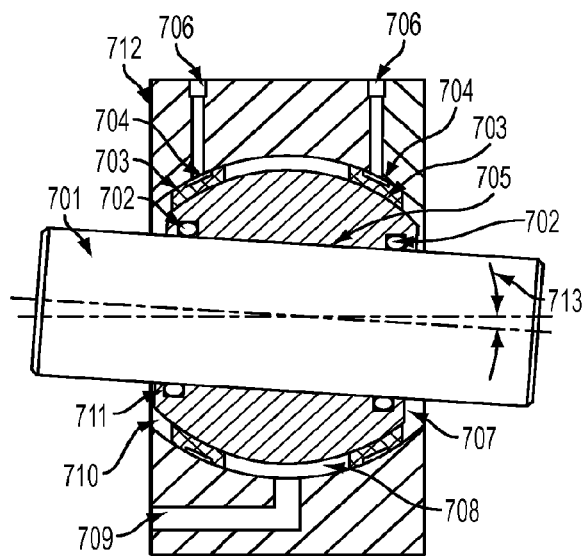
Figure 7C:
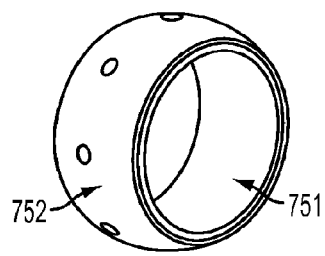
Figure 7C:
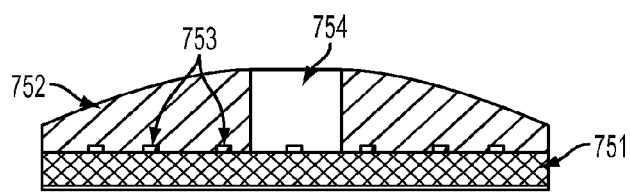

FIG. 6C is a close-up of the flexure seal runner and shows the bearing face 661, the flexure components 662, one of the through holes for mounting 663 and the area 664 which was either machined, ground or EDM away from a solid stainless steel blank. There may be other ways to manufacture a flexure-based runner.

Methods for providing additional compliance are disclosed. Starting with the simpler embodiments; in FIGS. 7A and 7B we have a shaft 701 of a piece of equipment that is carrying with it a runner 711 that has a spherical outside diameter. The runner with a spherical OD couples to the shaft through two O-rings 702. This is advantageous because many shafts have experienced damage and/or out of round at their ends, keyways will often have raised edges, these high spots can damage a precision air bearing/sealing surface while being slid over these damaged features and into position. O-rings can tolerate these types of high spots due to their resiliency. Another advantage is that it reduces tolerance concerns for the fit at 705. This may not be an issue if a cartridge seal employing this technology is associated with an accompanying sleeve for the shaft that goes with the cartridge seal. The OD of the spherical runner mates to complementarily shaped spherical air bearings, which in the preferred embodiment would be porous media restricted. Spherical air bearings are mounted in yoke 712 which is split vertically, split not shown, and air is fed in to the back of the porous restrictive elements 703 through air input port 706 and distribution labyrinth 704. Using this technique as taught will provide for an air gap with several bar's pressure between the porous carbon restrictive element 703 and the OD of the spherical runner 711. This air film provides for a frictionless and wear free way of providing angular freedom to the shaft and avoiding over constraint from angular changes in the shaft as indicated by 713, 707 and 710. 709 provides a vent in between the two spherical bearings, this avoids a pressure buildup between the two bearing elements and so the bearings see more pressure drop and their performance increased.

With reference to image 7C. The porous media restrictive element 751 is shrunk fit in to the nonporous housing 752 which may be made of aluminum or steel or stainless steel or some other suitable material. A plenum 753 comprising approximately 50% of the surface area between the housing and the porous media and having a conductance at least 10 times that of the free flow through the porous media may be disposed on the ID of the housing or the OD of the porous media or some of both. An air feed hole 754 to the plenum provides air flow to the plenum and then through the porous media and into the bearing gap. The air bearing gap provides an axial degree of freedom, but as noted above in areas where a precision shaft is not available may be wise to rely on the O-rings illustrated in 700 or the use of a sleeve for the shaft that comes with the seal cartridge. It should be noted that in FIG. 7C the shaft may spin within journal gas bearing as well still leaving axial shaft freedom.

Figure 8A:
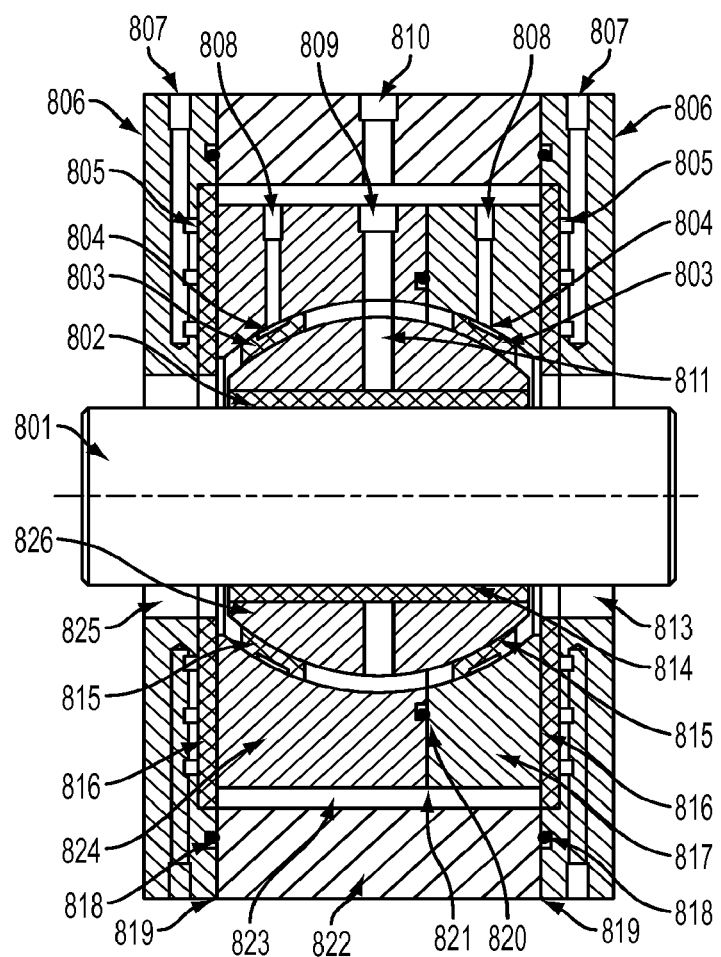
Figure 8B:
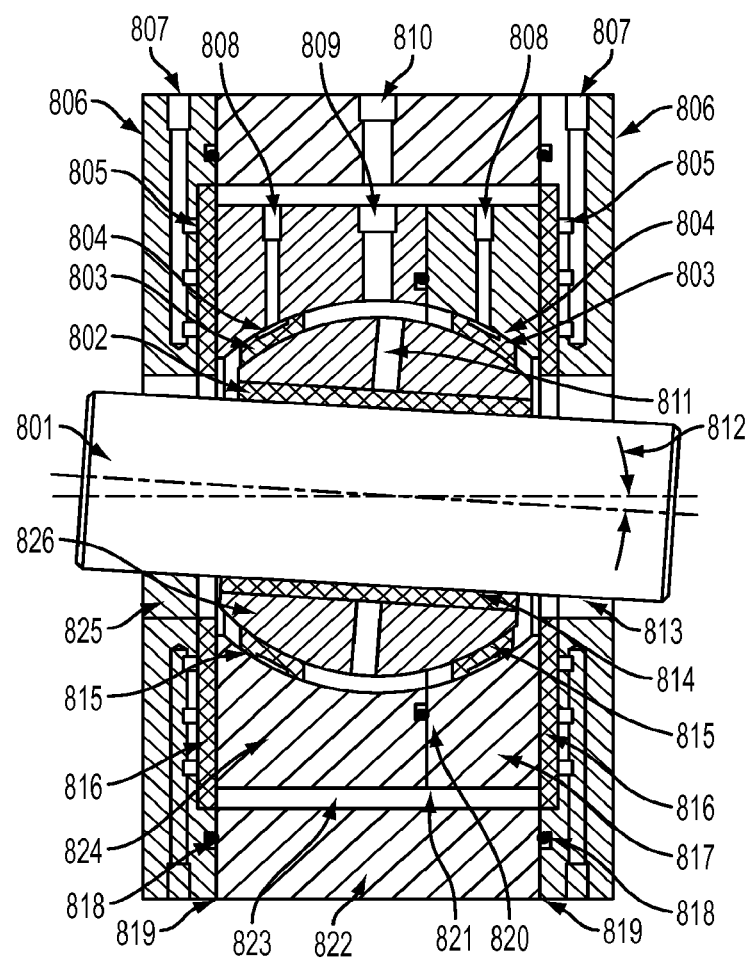
Figure 9A:
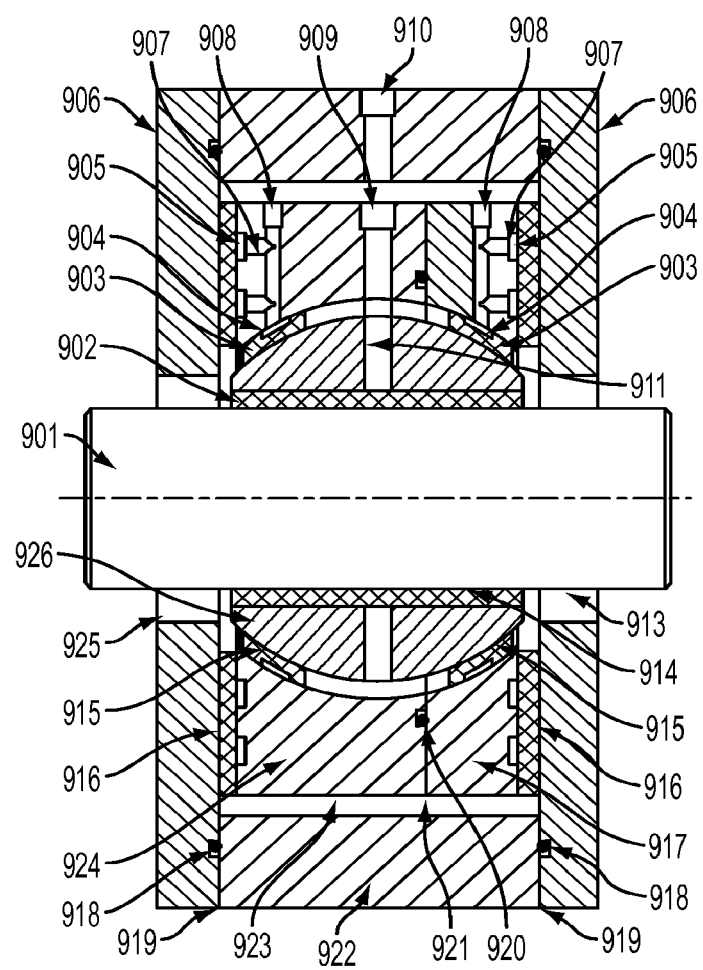
Figure 9B:
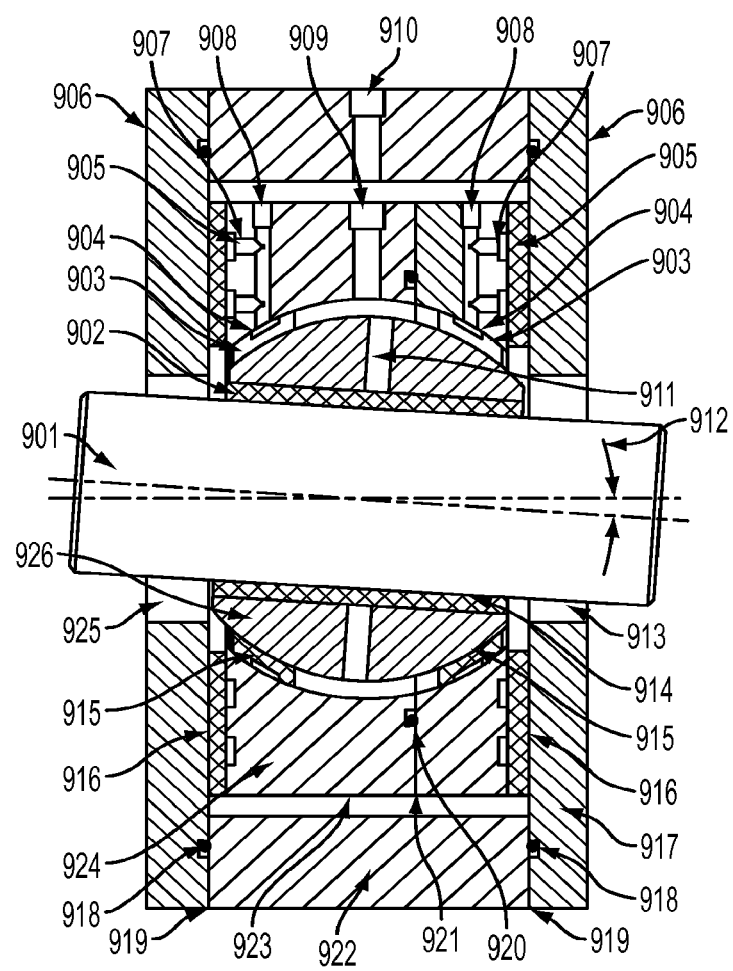

FIGS. 8A and 8B show an embodiment appropriate for providing freedom for frictionless radial displacements of the shaft. This is accomplished by taking the yoke 824 and 817 also described in FIGS. 7A-7C and suspending it in between thrust faces similar to those in FIG. 2A. The yoke 824 is keyed with an anti-rotation to pin (not shown) to keep it from rotating with the shaft. This anti-rotation pin is provided with enough clearance that allows free motion of the components over the limited range compliance is intended. This yoke is split at 821 and O-ring seal 820 is employed. A thrust plate or collar 806 of appropriate strength for the application is provided with porting 807 and plenum 805 for distributing the air pressure to the back of the porous media 816. The thrust collars 806 may be sealed at joint 819 by an O-ring in a groove such as 818. The spherical gas bearings have a plenum 804 and air input port 808 and a restrictive porous element 803 also as described before in FIG. 7A-7C. In this embodiment though, there is no vent between the spherical bearings, instead the high pressure developed in this region is used to conduct pressure through to the Journal bearing in a non-contact fashion. External pressurization ported through 810 in stationary housing 822 then to the Plenum area 823, which is sealed at each side by the thrust bearings, and then through port 809 into the area between the spherical bearings where it can pass in a noncontact fashion through port 811 Into Plenum as described in 753, then through the restrictive element 802 into the gap between the rotor of the restrictive element bearing face at 814.

This embodiment provides for axial freedom of the shaft, angular freedom of the shaft, and radial displacements of the shaft in a frictionless manner using bearings which are also seals in all motion locations.

The shaft 801 may spin and move axially within the bearing element 802 and the runner 826. The runner is not coupled to anything except through air bearing films and so it may rotate also. This would allow them to share the speed of the shaft, so for a shaft spinning at 20,000 RPMs 10,000 RPMs could be taken by the Journal bearing 814 if the runner were spinning at 10,000 RPMs and the other 10,000 RPMs could be taken between the spherical bearings 803, 815 and the runner 826.

The difference between FIGS. 8A and 8B and FIGS. 9A and 9B is that porting for the opposed axial air bearings which provide friction free radial motion for the shaft have had the porting 908 and the Plenum 905 moved internal to the yoke 924 from the thrust plates 906 where they were in FIG. 8A-8B. This simplifies the manufacturing of the thrust plates 906 and allows them to retain a higher stiffness for their given axial thickness, because the yoke is seeing a compressive load in what amounts to column stiffness where the thrust cap sees a cantilevered bending stiffness which is not as strong. It should be noted that in each of the bearing arrangements in FIG. 8A-8B and FIG. 9A-9B that the interface between the porous media gas bearing surface and the guide way it acts upon 916, 915 and 914 only one side of the bearing elements are open to ambient pressure, this reduces the effect of the externally pressurized air bearings but the bearings do retain significant load capacities.

Figure 10A:
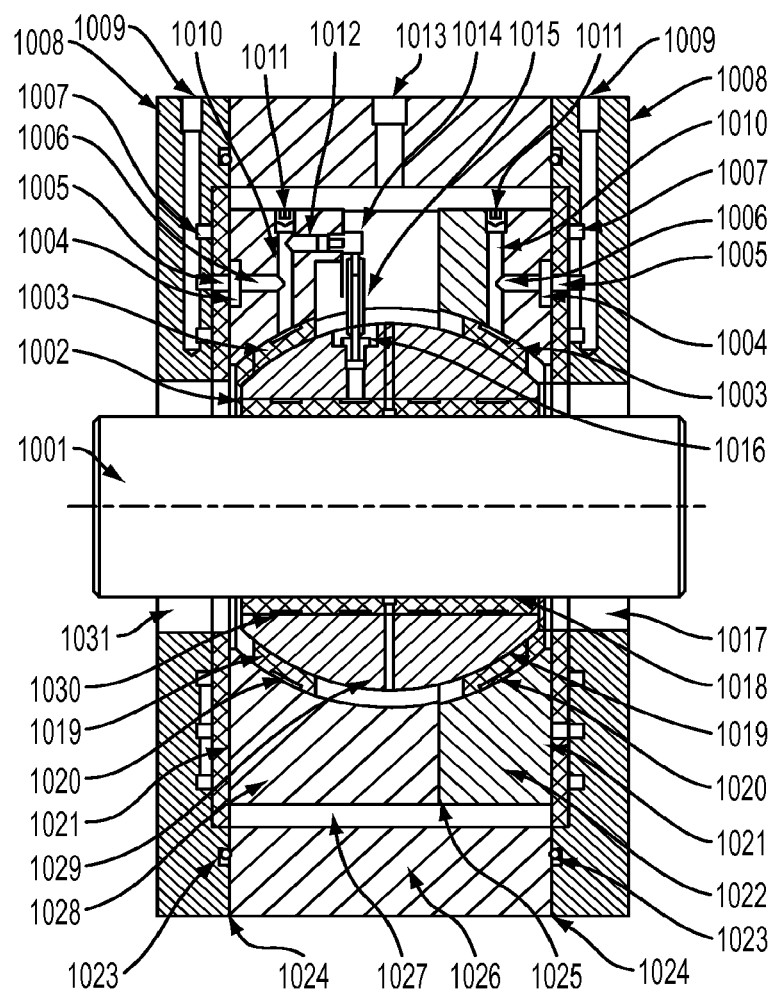
Figure 10B:
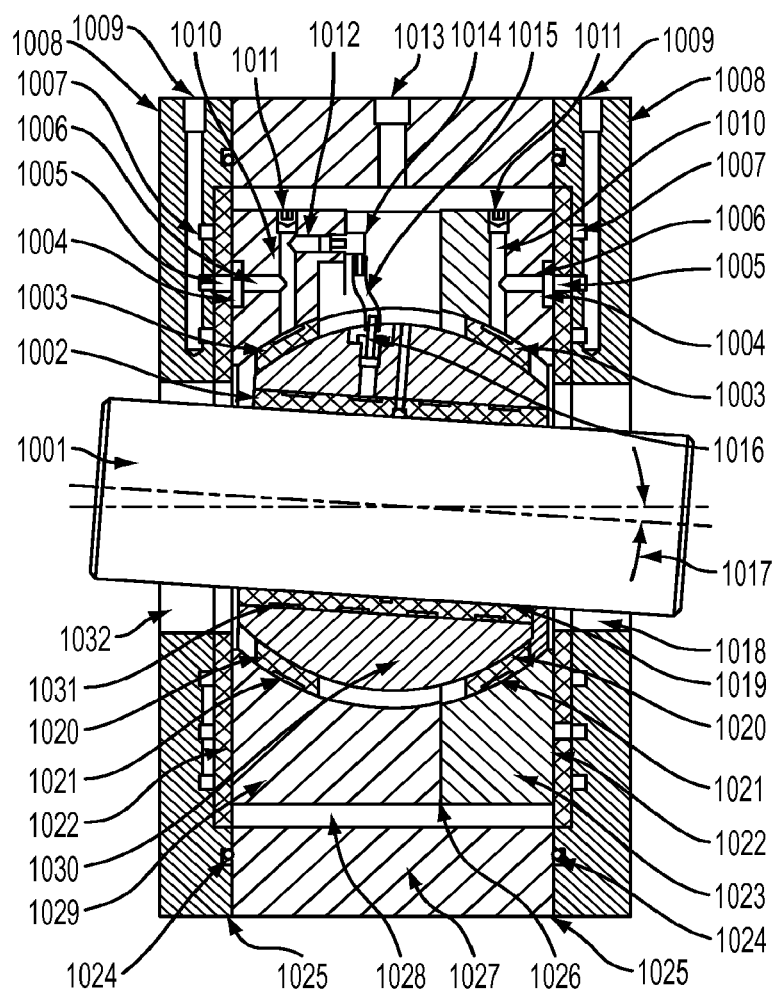

The difference between FIGS. 8A-9B and FIG. 10 is that FIG. 10 is fully vented, that is all of the gas bearings see the full pressure drop between the external input pressure and ambient or a process pressures that exist at the escape edges of the bearings. So the external pressure is ported into the thrust plates 1008 via 1009 and distributed behind the porous media restrictive element by Plenum 1007. Additionally a through hole 1005 has been drilled through the porous media and directly in to the Plenum 1007. This hole aligns roughly with a hole in the yoke 1006, which has a counter bore 1004 that maintains conductance between 1005 and 1006 during the designed displacements of this compliance device. It stays aligned due to the anti-rotation pin discussed in FIGS. 8A-8B. Hole 1006 provides conductance of pressure to both the spherical bearing element 1003 and the Journal porous bearing element 1002 via the cross hole 1010 drilled in the yoke 1028 which is later plugged 1011. 1010 delivers the pressure and flow to the Plenum 1020 providing the external pressurization for the spherical restrictive elements/bearings 1020. Cross hole 1010 also communicates with hole 1012 which is threaded to accept a fitting, the fitting is connected to a flexible tube which provides motion compliance in the conductance of pressure to be spherical runner which is now also keyed to the yoke to provide anti-rotation relative to the yoke. The pressure and flow for the journal restrictive element 1002 are provided through the fittings 1014, 1016 via the tube 1015 and into Plenum 1030 in FIG. 10A and 1031 in FIG. 10B.

An annular groove in the center of the Journal gas bearing portion provides even communication of the bearing/seal flow to a center vent hole. This is the radial hole in the spherical runner 1028 and is shown next to fitting 1016. This hole exhausts in the space between the spherical bearings and both of these bearings are able to exhausts through the hole that the fittings 1014, 1016 and tube 1015 partially consume. Hole 1013 through housing 1026 provides the exhaust for these flows plus flow from the opposed axial faces 1021.

Figure 11A:
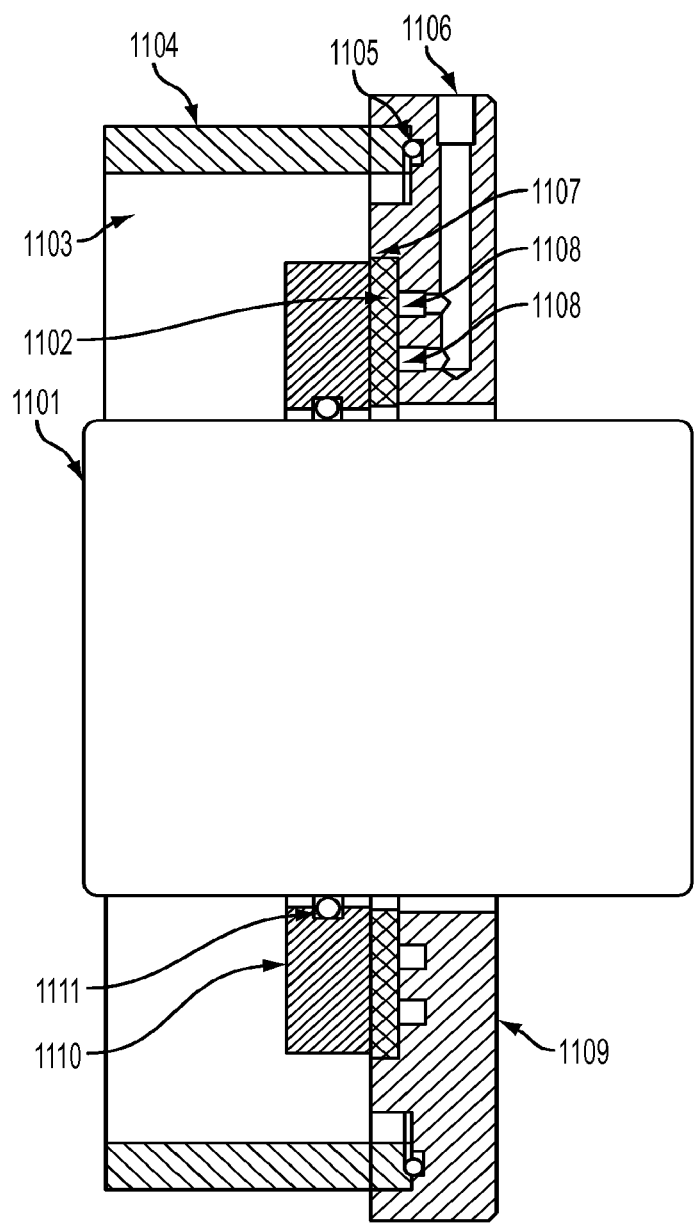

In order to locate a seal, as shown in FIG. 11A, a porous material 1102 which comprises one side of two opposing surfaces is used to evenly distribute hydraulic pressure from an external source of pressurized fluid (gas, liquid, steam, etc.) between the two surfaces. The pressure is ported through 1106 to Plenum 1108 then through the porous media 1102 and into the gap 1107. This hydrostatic pressure creates a force which is opposite the forces from pressure differences or springs trying to close the two faces together, the other face being the bearing seal side of 1110. This hydrostatic pressure may be adjusted to the point where the two faces are completely unloaded and zero contact pressure exists between the two faces even though the faces are in intimate contact 1107. Because the faces are in contact there is approximately zero flow through the gap and the line pressure being fed into the porous material will exist between the two faces.

Figure 11B:
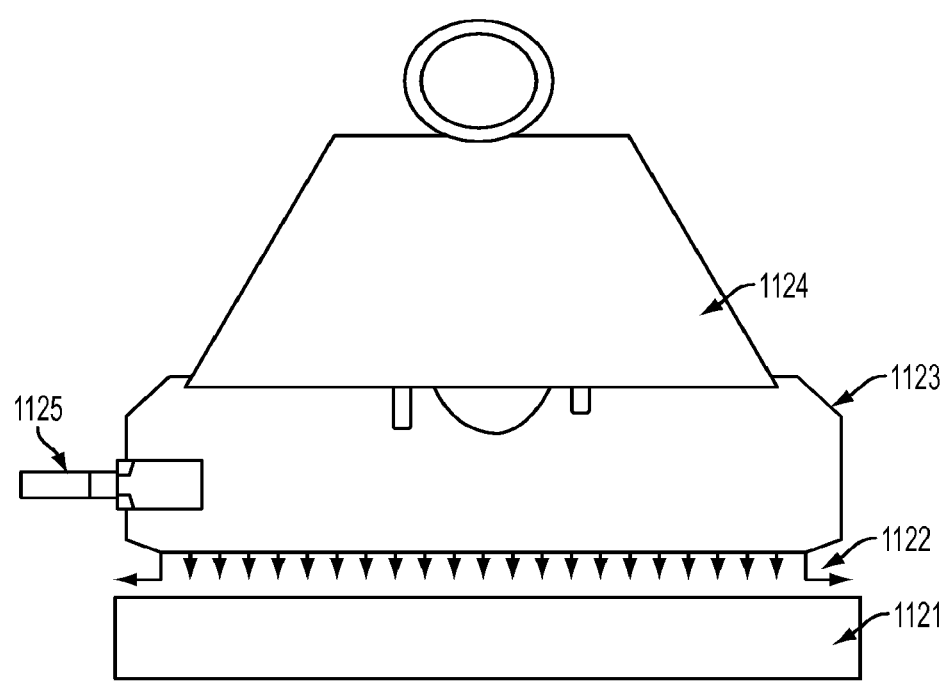

So in another illustrative example with reference to FIG. 11B, if there is 4,448 Newtons of force represented by 1124 urging the face of the seal body 1123 together with the counter face 1121 and the seal faces have 0.00645 m² of area between them and 689.6 kN/m² air pressure is fed in at port 1125 and this pressure is distributed cross the back of the porous medium using a Plenum as taught multiple times before in this specification, the porous seal face will have exactly zero contact force between the faces as the hydrostatic force between the faces will equal the mass or force urging the seal faces together. This contact force can easily be adjusted by varying the input pressure to reduce wear and heat generated by friction.

This technique combines the high stiffness and damping of plane bearings and contact seals with the low friction and high speed capability of fluid film bearings and seals.

The porous media may be comprised of graphite, carbon, silicon carbide, Tungsten carbide, alumina or basically any porous and or sintered material. These materials are typically found as face seals and mechanical seals and as runners and runner faces in dry gas seals. Just instead of filling or sealing this porosity the porosity is used to conduct and evenly distribute hydrostatic pressure.

Orifice pocketed or step type air bearing compensations will not work in this application as only a uniform porous media is capable of evenly distributing a hydrostatic pressure with zero gap. For instance, if orifices were employed, when the faces were in contact hydrostatic pressure would only be exerted over the area of the orifices.

Figure 12:
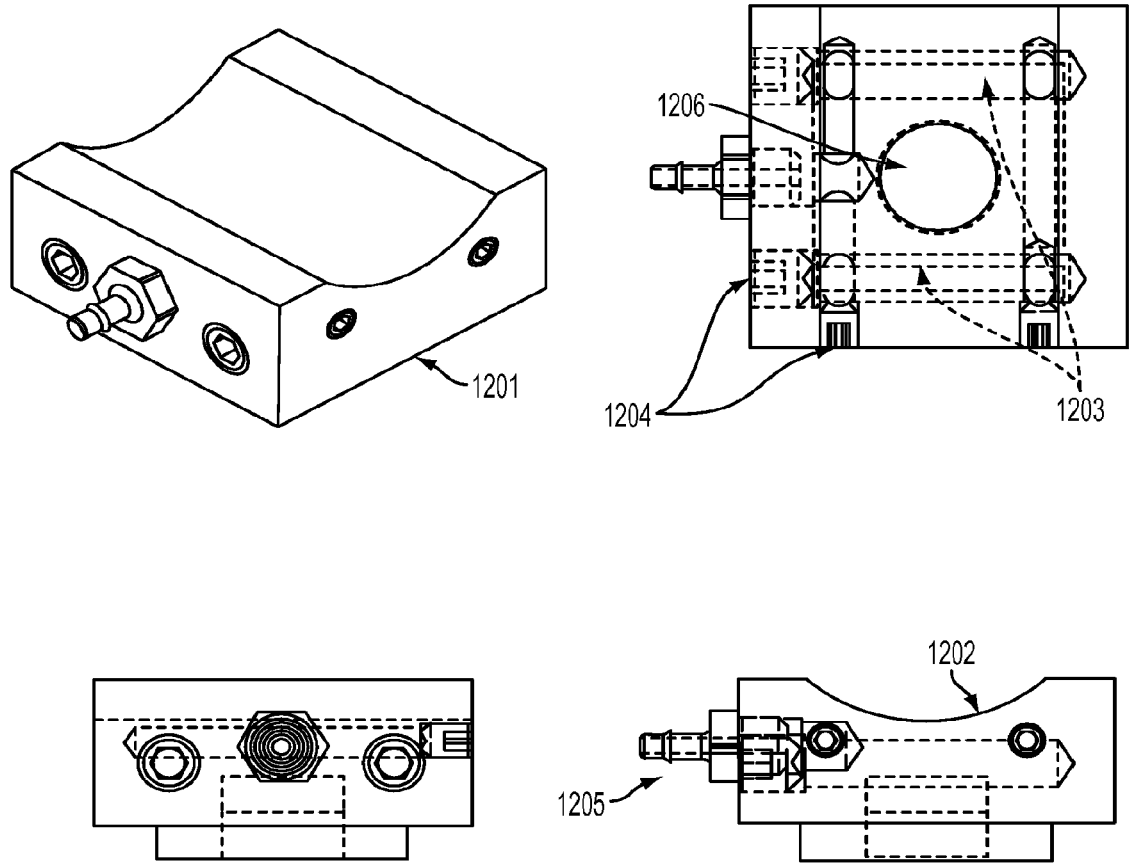

With reference to FIG. 12, this is an illustration of a solid carbon graphite tilting pad radial air bearing 1201. When manufacturing it from a single part rather than attempting to laminate two parts together the trouble of joining two components together for use under extreme temperatures is avoided. Most carbon graphite will not start to oxidize until it is in an environment over 800° C., so this provides a very extensive temperature range. In this case a Plenum to distribute the air to the back of the porous media face is accomplished by drilling cross holes 1203. These cross holes are threaded and plugged 1204 with high temperature ceramic or glaze which is later fired so that it becomes co-sintered with the carbon graphite. A ceramic insert from a metal cutting tool is sintered in at 1206 at the same time to distribute the load of the Hertzian contact of the tilting pad mechanism. 1205 represents a high temperature fitting known in the art. 1202 represents a diameter which would be complementary to a shaft that such a bearing would support.

It is also possible to co-fire separate ceramic components, for instance a nonporous housing with a porous media face. The co-firing essentially makes a monolithic part but there was an opportunity to machine plenums or labyrinths into the green parts before they were sintered or fired together. Alternatively a glass bonding, similar to a glazing operation done on the outside of a piece of pottery may be employed as a high temperature glue to bond separate ceramic components into a single high temperature part that could be used as a bearing or a seal in extreme temperature environments While preferred embodiments have been set forth in detail with reference to the drawings, those skilled in the art who have reviewed the present disclosure will readily appreciate that other embodiments can be realized within the scope of the invention, which should therefore be construed as limited only by the appended claims.

What is claimed is:

1. An aerostatic or hydrostatic bearing and seal assembly comprising:
    a first opposing surface that is a circumferential surface or sleeve on a rotatable shaft;
    a second opposing surface that is a porous media;
    the porous media connected to a seal body and positioned over and covering a plenum in the seal body;
    the plenum being connected to a conductive passage for communicating a pressurized fluid to the plenum and the porous media distributing the pressurized fluid between the circumferential surface or sleeve and the porous media to create an annular film between the porous media and the circumferential surface or sleeve; and
    wherein the bearing and seal assembly is coupled to an end of a housing that is concentric to the shaft with an o-ring disposed therebetween so that the first and second opposed surfaces form a radial bearing and serve as a seal so that the pressurized fluid between the circumferential surface or sleeve and the porous media prevents the contents contained in the housing from escaping.

2. The aerostatic or hydrostatic bearing assembly of claim 1, wherein the bearing assembly is coupled to the housing by a compliant mount.

3. The aerostatic or hydrostatic bearing assembly of claim 2, wherein the compliant mount is a bellows.

4. An aerostatic or hydrostatic bearing seal assembly comprising:
    a rotatable shaft with a runner hard mounted to the rotatable shaft;
    a housing located concentric to the shaft and defining a cavity;
    an annular seal body having a first ring and a second ring, the annular seal body coupled to the housing; and
    the first ring includes a first porous media positioned over a first plurality of concentric annular plenums each having a port that is directly connected to a first conductive passage,
    the second ring opposed to the first ring and separated from the first ring by the runner, the second ring includes a second porous media positioned over a second plurality of concentric annular plenums each having a port that is directly connected to a second conductive passage,
    the annular seal body includes the first and second conductive passages for communicating pressurized fluid directly to each plenum of the first and second plurality of plenums through the ports, wherein the plenums and the porous media distribute the pressurized fluid between the runner and the first ring and the second ring to create annular films on each side of the runner between the runner and the porous media.

5. The aerostatic or hydrostatic bearing seal assembly of claim 4 wherein the runner and first and second porous media are configured to serve as a thrust bearing.

6. The aerostatic or hydrostatic bearing seal assembly of claim 4 wherein the runner is a slender blade having thickness between 0.1 and 1 mm.

7. An aerostatic or hydrostatic bearing seal assembly comprising:
    a first opposing surface that is a first face of a runner coupled to a rotatable shaft;
    a second opposing surface that is a first porous media;
    a housing located concentric to the shaft and defining a cavity;

an annular seal body coupled to the housing;

wherein the annular seal body includes a plurality of concentric annular plenums arranged concentrically about the shaft, each plenum directly connects to a port, and the first porous media is positioned over the plurality of concentric annular plenums; and wherein the annular seal body further includes a conductive passage for communicating pressurized fluid to the plurality of concentric annular plenums directly through the ports, wherein the first opposing surface and the second opposing surface are configured to serve as a contact bearing, the plurality of concentric annular plenums and the first porous media are configured to distribute the pressurized fluid to provide an unloading force between the first and second opposing surfaces.

8. The aerostatic or hydrostatic contact bearing assembly of claim 7, wherein the runner is coupled to the shaft using a compliant mount.

9. The aerostatic or hydrostatic contact bearing assembly of claim 7, wherein the runner is a single blade.

10. The aerostatic or hydrostatic contact bearing assembly of claim 7 wherein the runner is hard mounted to the shaft.

11. The aerostatic or hydrostatic contact bearing assembly of claim 7 wherein the first opposing surface and the second opposing surface are pre-loaded, or biased in a closing direction using springs or other components.

* * * * *